US012318334B2

(12) United States Patent
Lorman et al.

(10) Patent No.: US 12,318,334 B2
(45) Date of Patent: Jun. 3, 2025

(54) SYSTEMS AND METHODS FOR PATIENT POSITIONING

(71) Applicant: GLOBUS MEDICAL, INC., Audubon, PA (US)

(72) Inventors: Bess Lorman, Harleysville, PA (US); Jenna Israel, Eagleville, PA (US); Phillip Levins, Conshohocken, PA (US)

(73) Assignee: Globus Medical, Inc., Audubon, PA (US)

( * ) Notice: Subject to any disclaimer, the term of this patent is extended or adjusted under 35 U.S.C. 154(b) by 294 days.

(21) Appl. No.: 17/929,110

(22) Filed: Sep. 1, 2022

(65) Prior Publication Data

US 2024/0074930 A1 Mar. 7, 2024

(51) Int. Cl.
*A61G 13/08* (2006.01)
*A61G 13/12* (2006.01)

(52) U.S. Cl.
CPC ......... *A61G 13/08* (2013.01); *A61G 13/1285* (2013.01)

(58) Field of Classification Search
None
See application file for complete search history.

(56) References Cited

U.S. PATENT DOCUMENTS

| | | | | |
|---|---|---|---|---|
| 4,824,089 | A | 4/1989 | Dickhudt et al. | |
| 5,147,287 | A | 9/1992 | Jewell et al. | |
| 5,582,379 | A | 12/1996 | Keselman et al. | |
| 7,117,551 | B1 | 10/2006 | Dinkler, II et al. | |
| 8,584,281 | B2 | 11/2013 | Dial et al. | |
| 9,155,672 | B2 | 10/2015 | Farag et al. | |
| 9,408,767 | B2 * | 8/2016 | Atalay | A61G 13/0036 |
| 9,468,576 | B2 | 10/2016 | Jackson | |
| 9,744,087 | B2 * | 8/2017 | Jackson | A61G 13/02 |
| 10,881,566 | B2 | 1/2021 | Jackson | |

FOREIGN PATENT DOCUMENTS

| | | | | |
|---|---|---|---|---|
| CN | 2002-536119 | A | 10/2002 | |
| EP | 1785125 | A2 * | 5/2007 | A61G 13/12 |
| GB | 2229366 | A * | 9/1990 | A61G 13/0054 |

* cited by examiner

*Primary Examiner* — Adam C Ortiz

(57) ABSTRACT

Systems for positioning a patient are provided. A patient positioning system comprising: an upper support comprising: a mounting plate for a pad; a hinge comprising a curved surface including teeth, the curved surface operable to rotate; a pawl that is in contact with the teeth of the hinge, wherein the pawl is operable to allow rotation of the pad in a first direction due to angles of the teeth; a moveable member extending from the hinge, the moveable member including teeth; and a second pawl that is in contact with the teeth of the moveable member, the second pawl operable to allow movement of the moveable member due to angles of the teeth of the moveable member; and a lower support connected to the upper support via the moveable member.

20 Claims, 26 Drawing Sheets

700
701
704
901
902
903
905
907

SYSTEMS AND METHODS FOR PATIENT POSITIONING

BACKGROUND

Prone lateral lumbar interbody fusion (LLIF) may be performed on an open Jackson frame. However, traditional Jackson frames do not allow certain patient manipulation movements needed to improve access and ergonomics of LLIF in the prone position. Anterior-to-Psoas (ATP) access is also restricted using a traditional Jackson frame. In traditional lateral decubitus LLIF, surgeons often "break the bed" to put an angle between the ribs and iliac crest. This opens the space between the hips and ribs to improve access to difficult levels such as L4-5 and L1-2, especially in patients with challenging anatomy. With the patient positioned prone on a Jackson frame, however, there is currently no way to controllably induce coronal break on the patient.

Lateral surgery in the prone position often has poor ergonomics. Jackson frame height and tilt limitations, as well as surgeon height/stature may lead to reduced visualization of the surgical corridor and uncomfortable working angles. There is a need to improve surgeon ergonomics by increasing control over patient height and tilt.

LLIF requires true anteroposterior (AP) and lateral C-arm imaging. Standard Jackson frames only allow about 25 degrees of tilt. Standard C-arm devices are unable to achieve a true lateral shot with the patient on a tilted Jackson frame table, until about 35 degrees of table tilt. The reasoning for this is that to see a direct lateral image the C-arm would need to "rainbow" over the patient about 65 degrees or more, which many devices are incapable of doing. However, increasing total patient tilt to about 40 to 45 degrees allows a C-arm to get a true lateral image by rainbowing over the patient. Therefore, with existing equipment, the surgeon would need to de-tilt the patient for each lateral fluoro shot.

An additional challenge to prone position lateral access is that it currently does not allow for an oblique or Anterior-to-Psoas (ATP) approach to the spine. The Jackson frame rail directly blocks the oblique trajectory that would be needed for proper ATP technique. Tilting the Jackson frame does not solve this issue because the frame rail remains in the same position relative to the patient. There is a need to increase patient tilt relative to the Jackson frame rail to facilitate ATP access.

SUMMARY

In an exemplary embodiment, the present disclosure provides A patient positioning system comprising: an upper support comprising: a mounting plate for a pad; a hinge comprising a curved surface including teeth, the curved surface operable to rotate; a pawl that is in contact with the teeth of the hinge, wherein the pawl is operable to allow rotation of the pad in a first direction due to angles of the teeth; a moveable member extending from the hinge, the moveable member including teeth; and a second pawl that is in contact with the teeth of the moveable member, the second pawl operable to allow movement of the moveable member due to angles of the teeth of the moveable member; and a lower support connected to the upper support via the moveable member.

In another exemplary embodiment, the present disclosure provides a patient positioning system comprising: an upper support comprising: a pad attached to a mounting plate; a hinge comprising a curved ratchet, the curved ratchet operable to rotate the mounting plate; a pawl that is in contact with the curved ratchet, wherein the pawl is operable to allow rotation in a first direction due to a surface of the curved ratchet; a moveable member extending from the hinge, the moveable member including a linear ratchet; and a second pawl that is in contact with the linear ratchet, the second pawl operable to allow movement of the linear ratchet in a first direction; a lower support connected to the upper support via the moveable member; and a frame, wherein the lower support is mounted to the frame.

In another exemplary embodiment, the present disclosure provides A patient positioning system comprising: an upper support comprising: a pad for receiving a patient; a curved ratchet, the curved ratchet comprising teeth, the curved ratchet operable to rotate the pad; a pawl that is in contact with the teeth of the curved ratchet, wherein the pawl is operable to allow rotation of the pad in a first direction due to a surface of the curved ratchet; a moveable member extending from the hinge, the moveable member including a linear ratchet; and a second pawl that is in contact with the linear ratchet, the second pawl operable to allow movement of the linear ratchet in a first direction; a lower support connected to the upper support via the moveable member, the upper support comprising a second pad; and a frame, wherein the lower support is mounted to the frame.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
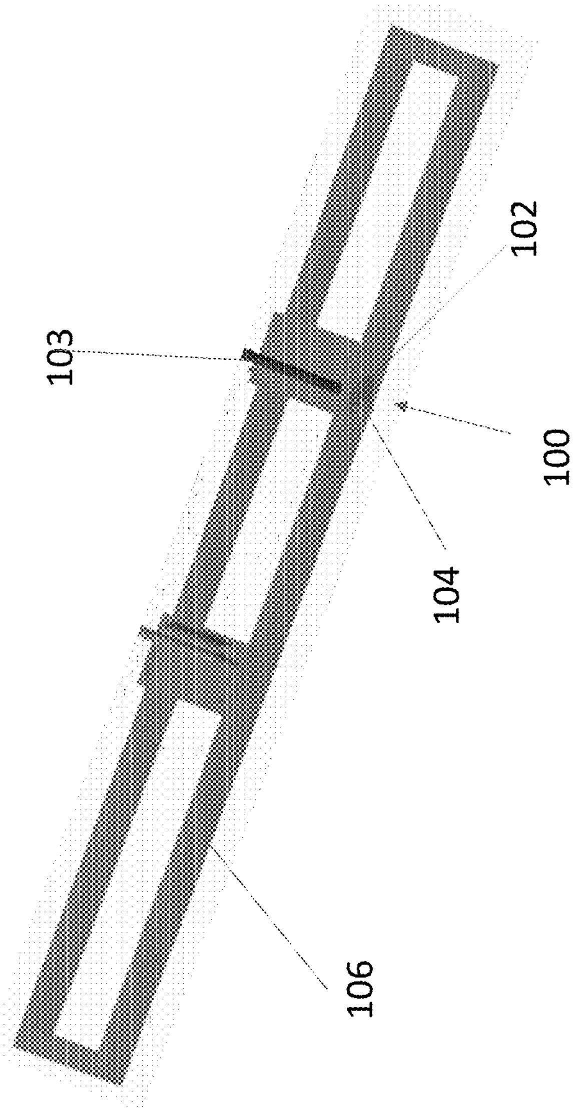
FIG. 1 illustrates a padding break assembly for positioning a patient, in accordance with particular embodiments of the present disclosure.

For the purposes of promoting an understanding of the principles of the present disclosure, reference will now be made to the implementations illustrated in the drawings and specific language will be used to describe them. It will nevertheless be understood that no limitation of the scope of the disclosure may be intended. Any alterations and further modifications to the described devices, instruments, methods, and any further application of the principles of the present disclosure are fully contemplated as would normally occur to one skilled in the art to which the disclosure relates. In particular, it may be fully contemplated that the features, components, and/or steps described with reference to one or more implementations may be combined with the features, components, and/or steps described with reference to other implementations of the present disclosure. For simplicity, in some instances the same reference numbers are used throughout the drawings to refer to the same or like parts.

Embodiments generally relate to spinal surgery. More particularly, embodiments relate to systems for breaking padding through a ramp connected to a screw. As a user turns the screw, the screw moves left or right, which drives the ramp that forces the padding along a track built into a base plate. Due to the orientation of the ramps, it is only possible to break one side (patient left/right) at a time, controlled by either clockwise or counterclockwise rotation of the screw.

The assembly breaks padding with ramps that are connected to a screw. The screw is threaded into the assembly. As a user turns the screw, the screw moves left or right, which drives each ramp that forces the padding along tracks built into a base plate. Alternatively, the screw may stay stationary and threaded ramps may translate relative to the screw. Due to the orientation of the ramp, it is only possible to break one side (patient left/right) at a time, controlled by either clockwise or counterclockwise rotation of the screw. The padding may be at the bottom position of the tracks because the ramps have not been actuated with the screw. The padding may move up the tracks because the ramps have been actuated with the screw. The screw has been rotated to move from left to right.

For tilt and height with the assembly, a chest pad assembly and hip pad assembly may each have a right and left jack, for four jacks total. By increasing the height of the hip left and chest left jack, the patient would tilt left side up. Similarly, increasing both the hip and chest right jacks would tilt the patient right side up. Lifting all four jacks would simply increase the height of the patient while keeping the patient level with the bed frame.

In some embodiments, a handle is attached to a screw. Turning the handle turns the screw, which drives the actuator. As the actuator moves, it lifts the jack assembly height. The top portion of the jack can have a variable endplate that allows the chest/hip pad assembly to match the left and right jack heights. The jack may be lowered with no tilt at zero degrees. In some examples, one side may be tilted. Or the jacks may be raised with zero tilt.

Each padding break assembly may be mounted to a frame (e.g., a Jackson frame or any other suitable frame for surgery). The frame may extend lengthwise to accommodate/support a patient during surgery. In some examples, the frame may include rails and may be made out of a rigid material such as for example, metal or carbon fiber.

Upper supports and lower supports may be attached to the frame. Lower supports drive the coronal break. To assist the actual movement of patient chest and hips with the respective pads, gripping features can be added to the lower supports such as upper supports. This is one way to fix the patient to the lower supports. The gripping features may have pads that have the functionality to compress on the patient's sides. In addition to providing fixation relative to the lower supports, the upper supports provide support as the frame is tilted and patient weight is applied to down tilted side.

Linear translational motion may occur for the upper support: ability to move the pads medially and laterally to compress on the patient's side. The translation feature always allows motion in the medial direction while providing self-locking in the lateral direction via a linear ratcheting system. This allows the user to compress the upper support without having to engage extra features. To release the ratcheting function and freely translate an arm, a handle is pulled or a button is pushed. The linear ratchet slides in and out of housing (easy removal of the upper support from the lower support) for shipping and modularity options. A release handle may be pulled to adjust the arm. This translation function can utilize any form of locking including peg-in-hole or crank. A locked configuration is where the pawl contacts the arm. An unlocked configuration is where the pawl does not contact the arm.

Axial pad rotation may also occur. This allows an ability to "squeeze" in for additional security to the patient. Rather than being locked at a single angle, the pads can rotate in toward the patient to apply additional pressure down toward the patient. The rotating feature always allows motion in the direction toward the patient while providing self-locking when rotating away from the patient via a curved ratcheting system.

Like the linear ratchet, this allows the user to compress the upper support further without having to engage extra features. To release the ratcheting function a handle is pulled which disengages a pawl. Alternatively, this feature could utilize a keyed shaft that provides free rotation until engaged. A locked configuration is where the pawl contacts the ratchet. An unlocked configuration is where the pawl does not contact the ratchet.

Some examples include a cephalad/caudal hinge. This allows an ability to rotate a pad toward or away from the head to move a pad mount out of the way of anatomy (i.e., arms) or surgeon working space. The pad mount is held rigidly until a handle is pulled, which allows rotation. When the handle is released, a hinge lock engages the pad mount back in place. The hinge lock may have a star shape so that the pad mount can lock in many positions. A locked configuration is where the handle has not been pulled and the hinge lock is locked. An unlocked configuration where the handle is pulled and the hinge lock is unlocked.

The cephalad/caudal hinge may include a modular pad mount. The cephalad/caudal hinge may allow for a pad mount to be removed for modularity. A locking feature (e.g., a hinge lock) is inserted into a keyed location on the pad mount. When a button is depressed, the keyed feature moves out of the way to allow rotation of the pad mount. When the button is released, the keyed featured snaps back to the pad mount to lock it in place.

To remove the pad mount from the body, the button is depressed (allowing rotation) and the pad mount is rotated to the 90° position. This aligns a hole in the pad mount that has the same shape of the keyed feature, allowing the lock to pass when the button is released. The pad mount can then be freely removed. An alignment feature may be present that helps guide the pad mount to the right location. Keyed locations and a hinging feature receive a locking feature. The feature may be rotated for placement into the locations. There are different locking positions with a pad mount and a pad mount lock. The lock may be rotated to fit into different portions of the mount.

A button may be depressed for adjustment/rotation. A locked configuration is where the button has not been depressed. An unlocked configuration is where the button has been depressed to allow rotation. There are different locking positions with a hinge locking feature including a pad mount for modularity. The mount and the feature may be removed and assembled modularly. The feature may be rotated for placement into the mount. Modular plates may be employed. Depressing the button allows adjustment of the plate. The button is depressed to shorten the overall height of the plate. Pads may be adjustable with Velcro. Upper supports may be coupled by a strap. The supports include slits to accept the strap that connects it to the opposing side for cinching on the patient.

A bolster has translational movement so that it can accommodate varying patient anatomy and allow the user to push the bolster into the patient's side after they've been positioned on the bed to create (or enhance) the coronal bend. The translational movement will have a locking feature so that once it is placed in the desired position it will stay rigidly in place. The locking feature may utilize ratcheting components or may use a "key" feature like a peg in hole. The translation feature may utilize a "crank" or "screw" where it moves forward as a handle is turned. The bolster could be on a table arm mount where it can be moved on joints and locked into place.

The bolster is made out of primarily radiolucent materials so as not to disrupt x-ray imaging. The slider portion may be contained within the track or be a separate removeable component. The slider is reversible such that it can be introduced into the track in either orientation. The reversible slider may have an offset pad support plate such that when introduced to the track in different orientations, the reach of the pad is larger or smaller, accommodating patients of varying size. A contralateral bolster may have a multi-tooth lock to allow the slider portion to lock into position at any location within the slider track. The multiple teeth may be controlled by one unlocking button such that the user can depress one button to unlock either (or both) locking pawl teeth.

A ratcheting mechanism may be used for adjustment of the bolster. The mechanism may include teeth which are metal. Other components may be plastic. The contralateral bolster may also have a depth stop to prevent the slider from extending too far along the track, to a position in which no locking teeth are engaged with the ratcheting component of the slider. The location of the depth stop may also be indicated with an etched or otherwise marked line in the track to give the user visualization when the slider is approaching or at the depth stop location.

The contralateral bolster may have removable padding. The pads may be attached with a dovetail or t-slot feature, hook-and-loop fasteners (e.g., VELCRO fasteners), or other attachment mechanism. The contralateral bolster may include a removable depth adapter that can be attached between the pad and pad plate in the event that the user needs additional throw. The adapter may be a radiolucent material to reduce interference with x-rays.

FIG. 1 illustrates padding break assembly 100, in accordance with particular embodiments of the present disclosure. The assembly 100 breaks padding (not shown) through a ramp 102 connected to a screw 104 thread into the assembly 100. As a user turns the screw 104, the screw 104 moves left or right, which drives each ramp 102 that forces the padding 103 along a track built into a base plate. Due to the orientation of the ramp 102, it is only possible to break one side (patient left/right) at a time, controlled by either clockwise or counterclockwise rotation of the screw 104. Each ramp 102 may be positioned on opposite sides of the break assembly 100. Each ramp 102 may be of any suitable shape to provide an inclined surface.

Each padding break assembly 100 may be mounted to a frame 106 (e.g., a Jackson frame or any other suitable frame for surgery). The frame 106 may extend lengthwise to accommodate/support a patient during surgery. In some examples, the frame may include rails and may be made out of a rigid material such as for example, metal. The frame 106 may include any suitable shape such as for example, a rectangle.

Figure 2A:
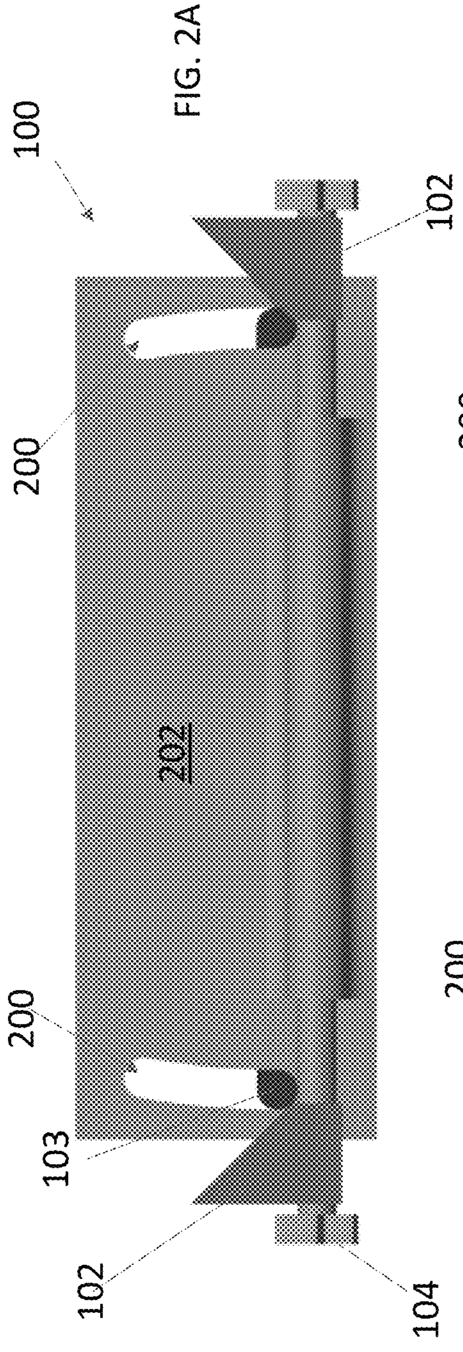
FIGS. 2A-2D illustrate close-up views of the break assembly, in accordance with examples of the present disclosure.

FIGS. 2A-2D illustrates different positions of the ramp 102 during adjustment, in accordance with examples of the present disclosure. FIG. 2A illustrates the bottom of the assembly 100. The assembly 100 breaks padding 103 with ramps 102 that are connected to a screw 104. The ramps 102 may be movably disposed on the screw 104. As noted above, the ramps 102 are disposed on opposite sides of the assembly 100 to allow for adjustment of the ramps 102 from either side.

The screw 104 is thread into the assembly 100. As a user turns the screw 104, the screw 104 moves left or right, which drives each ramp 102 that forces the padding 103 along tracks 200 built into a base plate 202. The screw 104 may extend lengthwise along the base plate 202. The tracks 200 may include slots in the base plate 202 to receive the padding 103. The padding may extend along a length of the screw 104 between the ramps 102.

Figure 2B:
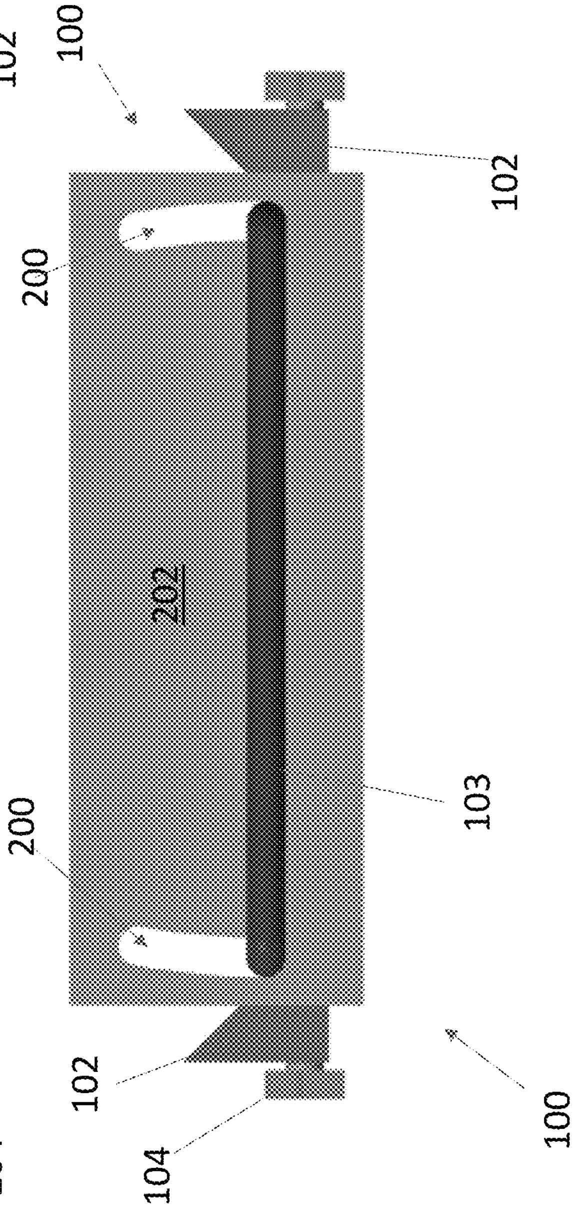

FIG. 2B illustrates the top of the assembly 100 with the padding 103 in the bottom position. That is, the padding 103 is at the bottom position of the tracks 200 because the ramps 102 have not been actuated with the screw 104. Due to the orientation of the ramp 102, it is only possible to break one side (patient left/right) at a time, controlled by either clockwise or counterclockwise rotation of the screw 104. The padding 103 is at the bottom position of the tracks 200 because the ramps 102 have not been actuated with the screw 104.

Figure 2C:
Figure 2D:
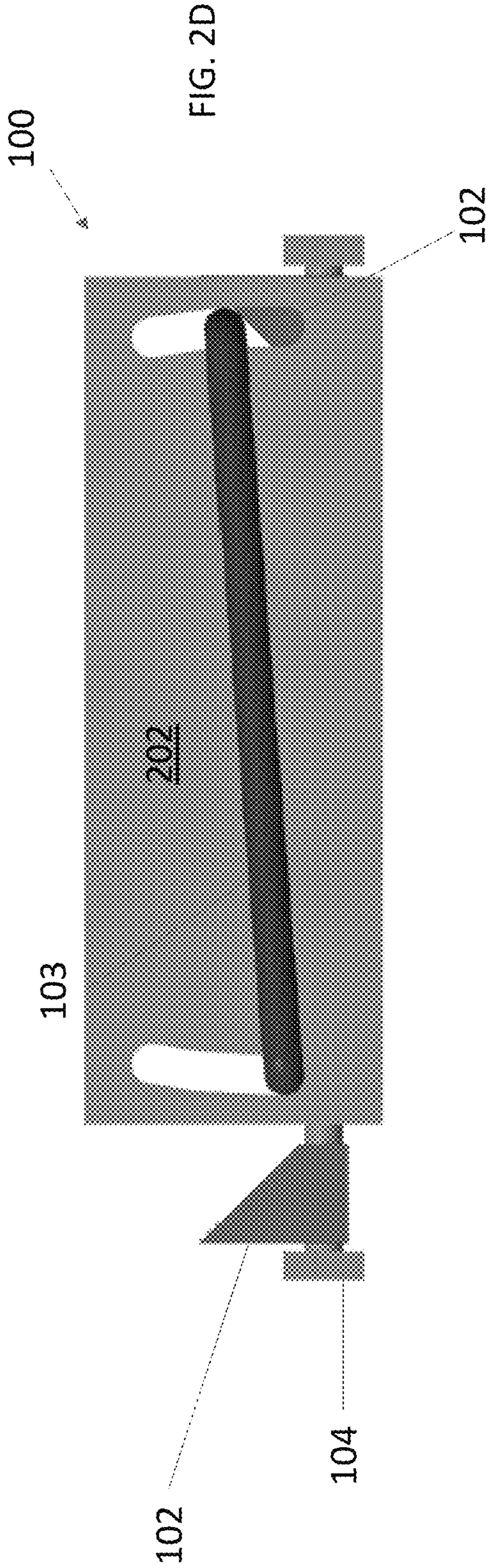

FIG. 2C illustrates the bottom of the assembly 100 in an actuated position. Each ramp 102 may be adjusted via the screw 104 to provide desired inclination of the padding 103. The padding 103 has moved up the tracks 200 because the ramps 102 have been actuated with the screw 104. The screw 104 has been rotated to move from left to right. FIG. 2D illustrates the top of the assembly 100 with the padding 103 in the actuated position. That is, the padding 103 has moved up the tracks 200 because the ramps 102 have been actuated with the screw 104. The padding 103 may be inclined due to movement of only one ramp 102. However, the padding 103 may be adjusted/inclined as desired based on adjustment of the screw 104.

Figures 3A, 3B, 3C:
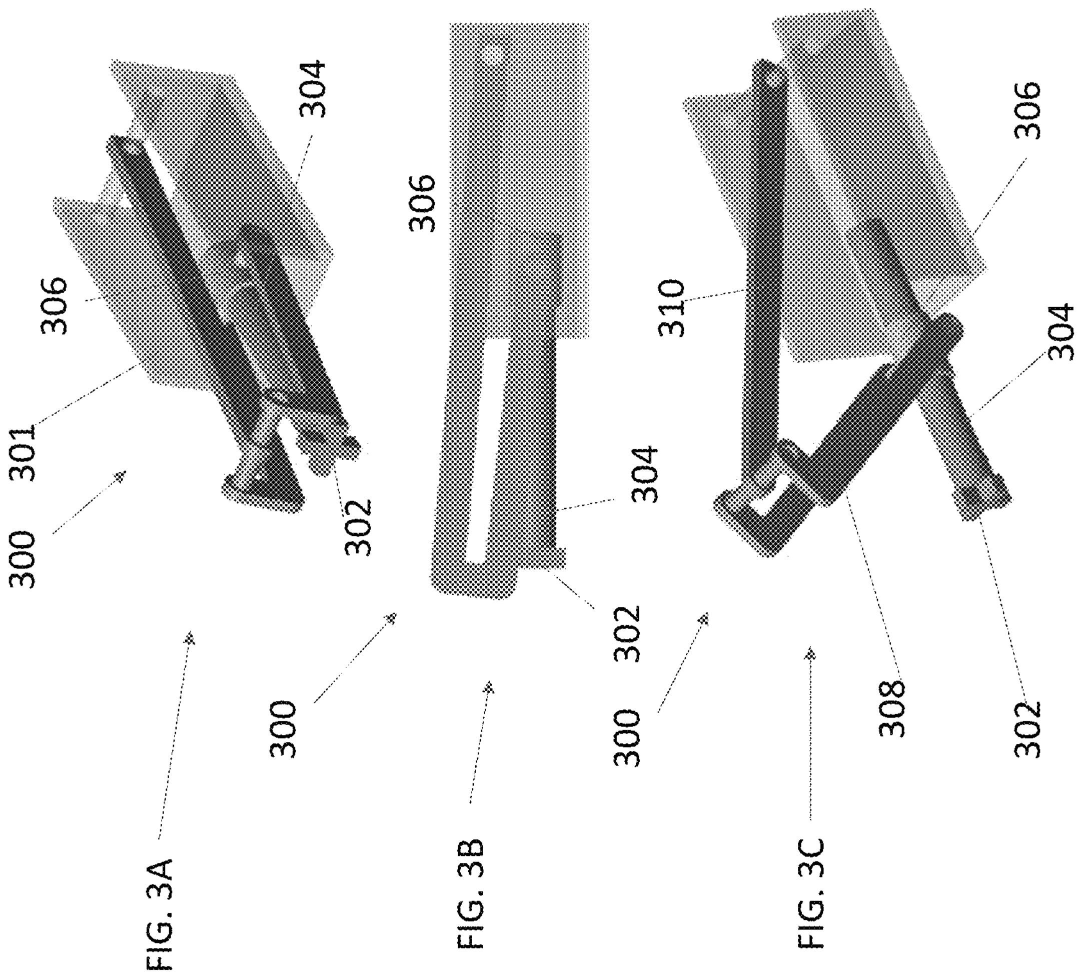
FIGS. 3A-3C illustrate perspective views of jacks for the variable tilt and height adjustment, in accordance with examples of the present disclosure.

FIGS. 3A-3F illustrate various views of a jack(s) 300 for tilt and height adjustments. FIGS. 3A-3C illustrate perspective views of the jack 300. A chest pad assembly and hip pad assembly may each have a right and left jack 300, for four jacks total. By increasing the height of the hip left and chest left jack, the patient would tilt left side up. Similarly, increasing both the hip and chest right jacks would tilt the patient right side up. Lifting all four jacks would simply increase the height of the patient while keeping the patient level with the bed frame.

FIG. 3A illustrates a housing 301 and a handle 302 that is attached to a screw 304 that is operable to move forward/inward and backward/outward, relative to the housing 301. Turning the handle 302 turns the screw 304, which drives an actuator 306. As the actuator 306 moves, it lifts the jack assembly height. The top portion of the jack can have a variable endplate (not in model) that allows the chest/hip pad assembly to match the left and right jack heights.

As shown on FIGS. 3B and 3C, the jacks 300 employ the screw 104 to rotate and move the actuator 306 forward or backward depending on direction of rotation of the handle 302. For example, as the screw 304 is rotated clockwise, the actuator 306 is pushed forward and when the screw 304 is rotated in the opposite direction, the actuator 306 is moved backwards. Pivotable members 308 and 310 may move in concert such that movement of the screw 304 actuates the members 308 and 310 to adjust height of the jack.

Figure 3D:
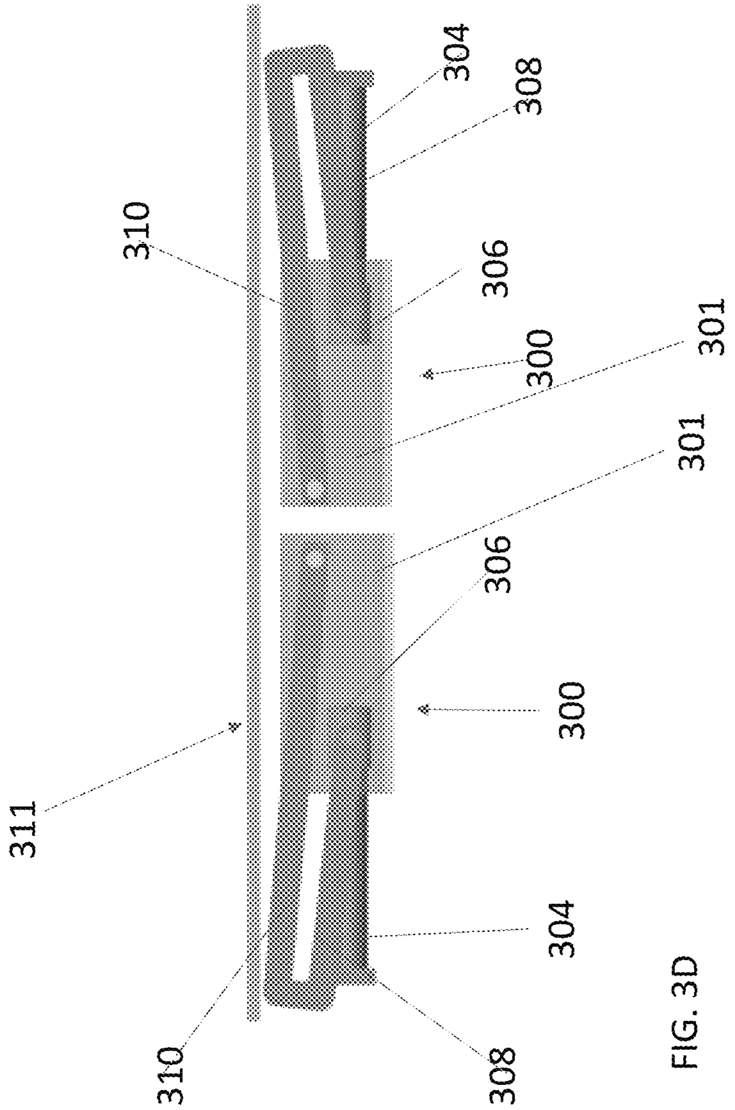
FIGS. 3D-3F illustrate different configurations of the jacks, in accordance with examples of the present disclosure.
Figure 3E:
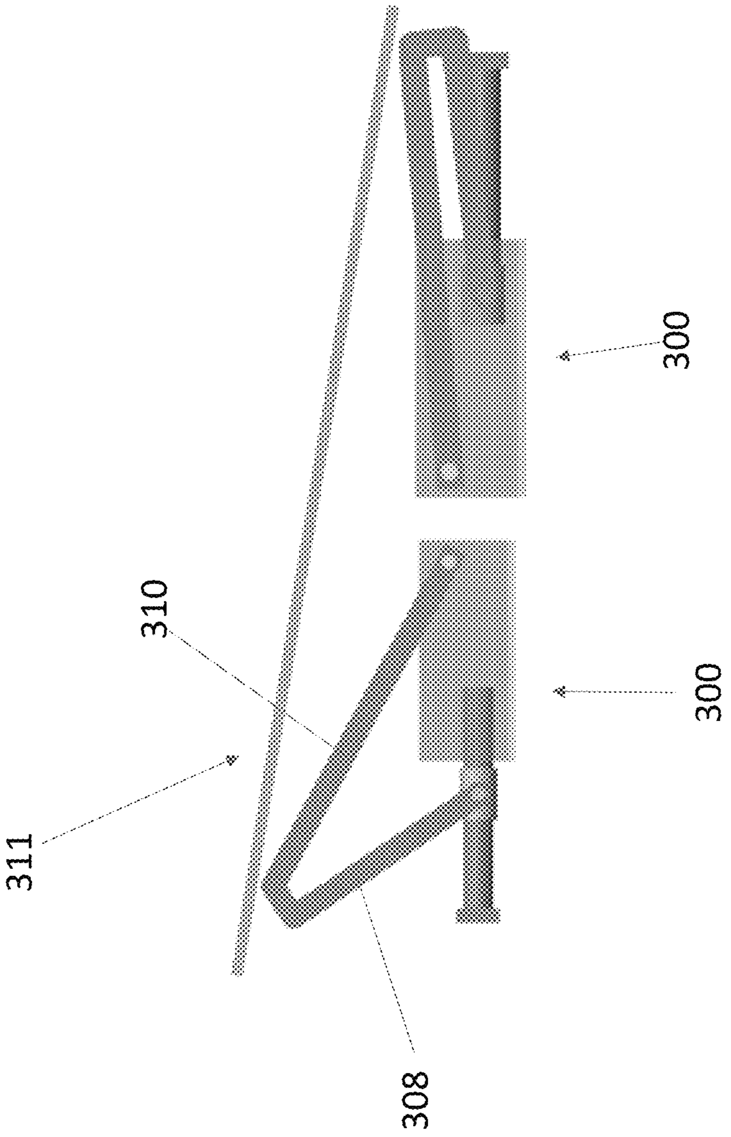
Figure 3F:
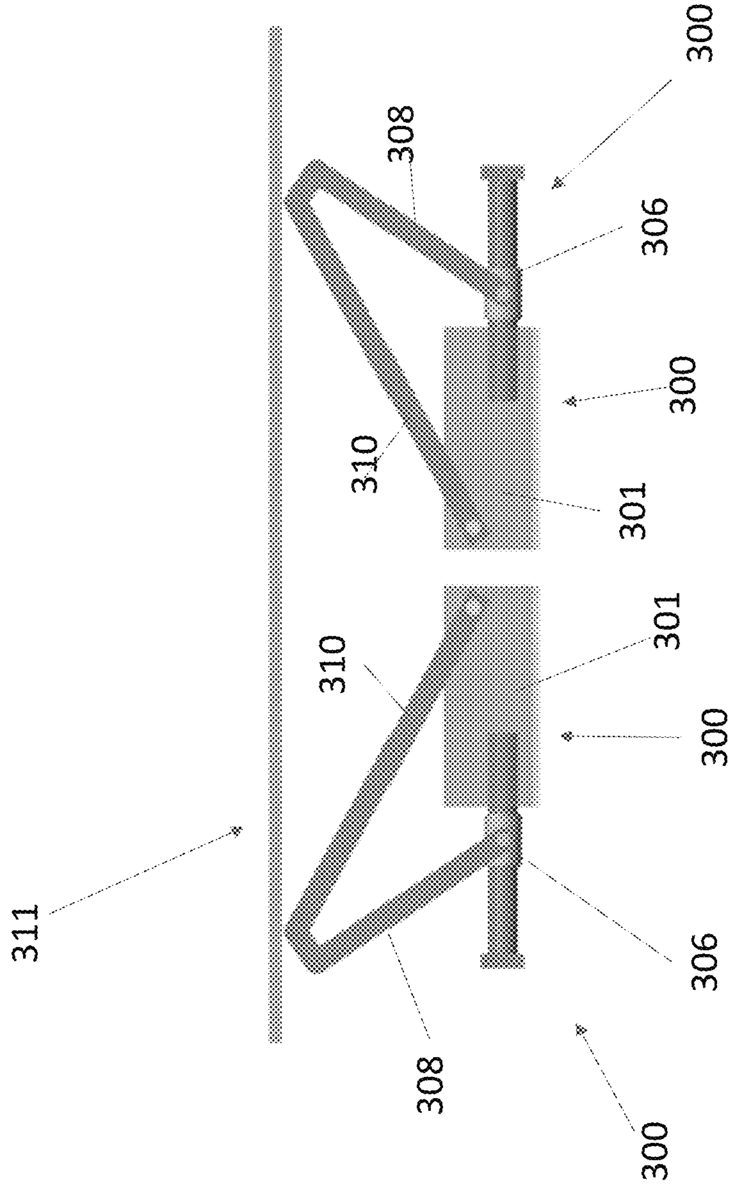

FIGS. 3D-3F illustrate various positions of the jacks 300. FIG. 3D illustrates the jack 300 lowered with no tilt. Line 311 represents a table-top angle that is at zero degrees. Pivotable members 308 and 310 are generally flat and are below the line 311. The screw 304 has been rotated such that the actuator 306 is in a forward position and the members 308 and 310 are pivoted to lie flat below the line 311.

FIG. 3E illustrates one side tilt. That is, the left jack 300 has been actuated. The pivotable members 308 and 310 on the left are elevated to provide inclination as desired. The actuator 306 has moved backward to provide the elevation. Whereas on the right side, the pivotable members 308 and 310 remain flat with the actuator pushed inward/forward relative to the housing 301. FIG. 3F illustrates the jacks 300 raised with zero tilt as shown with the line 311. The jacks 300 are adjustable as desired to provide proper positioning. All of the pivotable members 308 and 310 are elevated to provide inclination as desired. The actuators 306 are moved backward to provide the elevation. In some examples, the actuators 306 may travel into and out of the housing 301 during adjustment of the jacks 300.

FIGS. 4A-4H illustrates upper supports 400 and lower supports 402 for the frame 106. While the mechanism in the chest and hip pads described above. As shown on FIGS. 4A and 4B, lower supports 402 is what drives the coronal break, it is possible that the positioners slip under the patient.

To assist the actual movement of patient chest and hips with the respective pads, gripping features can be added to the lower supports such as upper supports 400. This is one way to fix the patient to the lower supports 402. The gripping features may have pads that have the functionality to compress on the patient's sides. In addition to providing fixation relative to the lower supports 402, the upper supports 400 provide support as the frame 106 is tilted and patient weight is applied down the tilted side. Both supports 400 and 402 may be attached to the frame 106 via brackets 403 (see FIG. 4B).

Figure 4A:
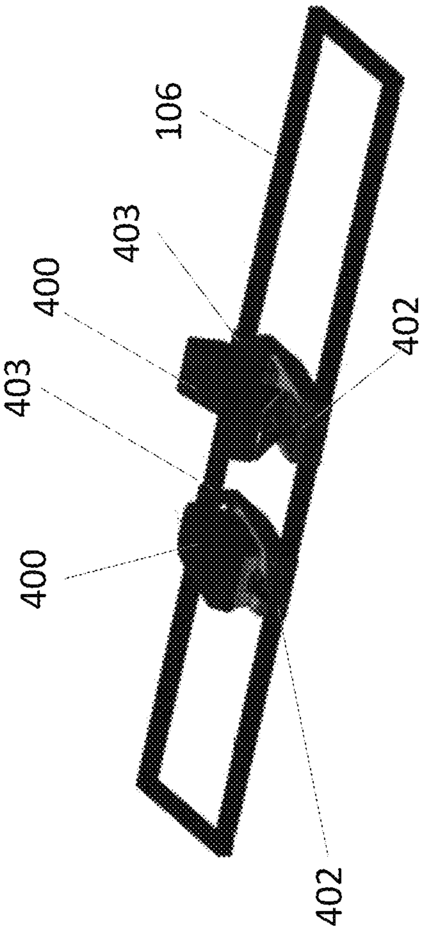
FIGS. 4A and 4B illustrate upper and lower supports, in accordance with examples of the present disclosure.
Figure 4B:
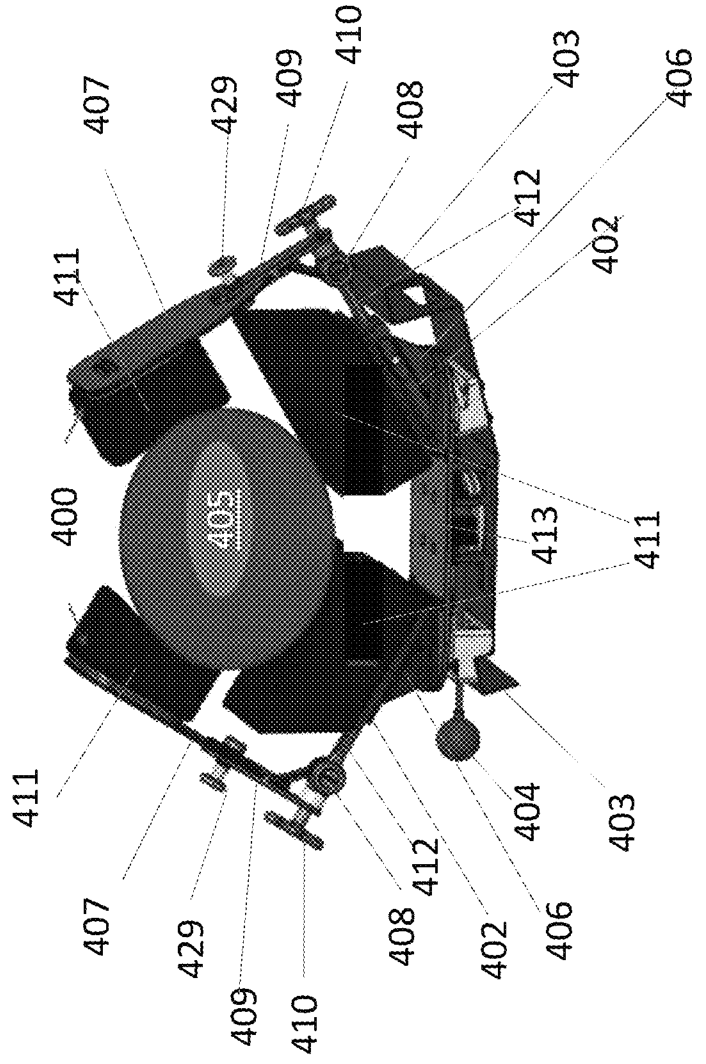

FIG. 4B illustrates that a patient 405 may be disposed between the upper supports 400 and the lower supports 402. Each upper support 400 may be attached an elongated member 407 such as a mounting plate. The member 407 may be in contact with a pin 429 which may be pulled outward to allow vertical movement of the upper support 400. The pin 429 may be pulled allowing the member 407 to slide along a track 409 below the member 407. Pads 411 may be disposed on each of the upper and lower supports.

Each upper support 400 may include a rotatable member (e.g., a hinge 408) to allow pivoting/rotation of the upper support 400 relative to the corresponding lower support 402. The hinge 408 may be coupled to the member 407 allowing inward/outward rotation of the member 407 to/from the patient 405. For example, a pin 410 may be pulled to unlock the hinge 408 thereby allowing rotation of the member 407 (e.g., a mounting plate for each pad 411).

The pin 410 may then be moved forward to lock the position of the hinge 408 in place after desired rotation of the upper support 400. The lower supports 402 may each be disposed adjacent to the moveable member 412 that may extend or retract in a linear direction. A plate 413 may be used to mount the lower supports 402. In some examples, the lower supports 402 do not rotate nor extend/retract and are fixed in place. The lower supports 402 may be angled relative to the base plate via angled structures 406.

Figures 4C, 4D, 4E:
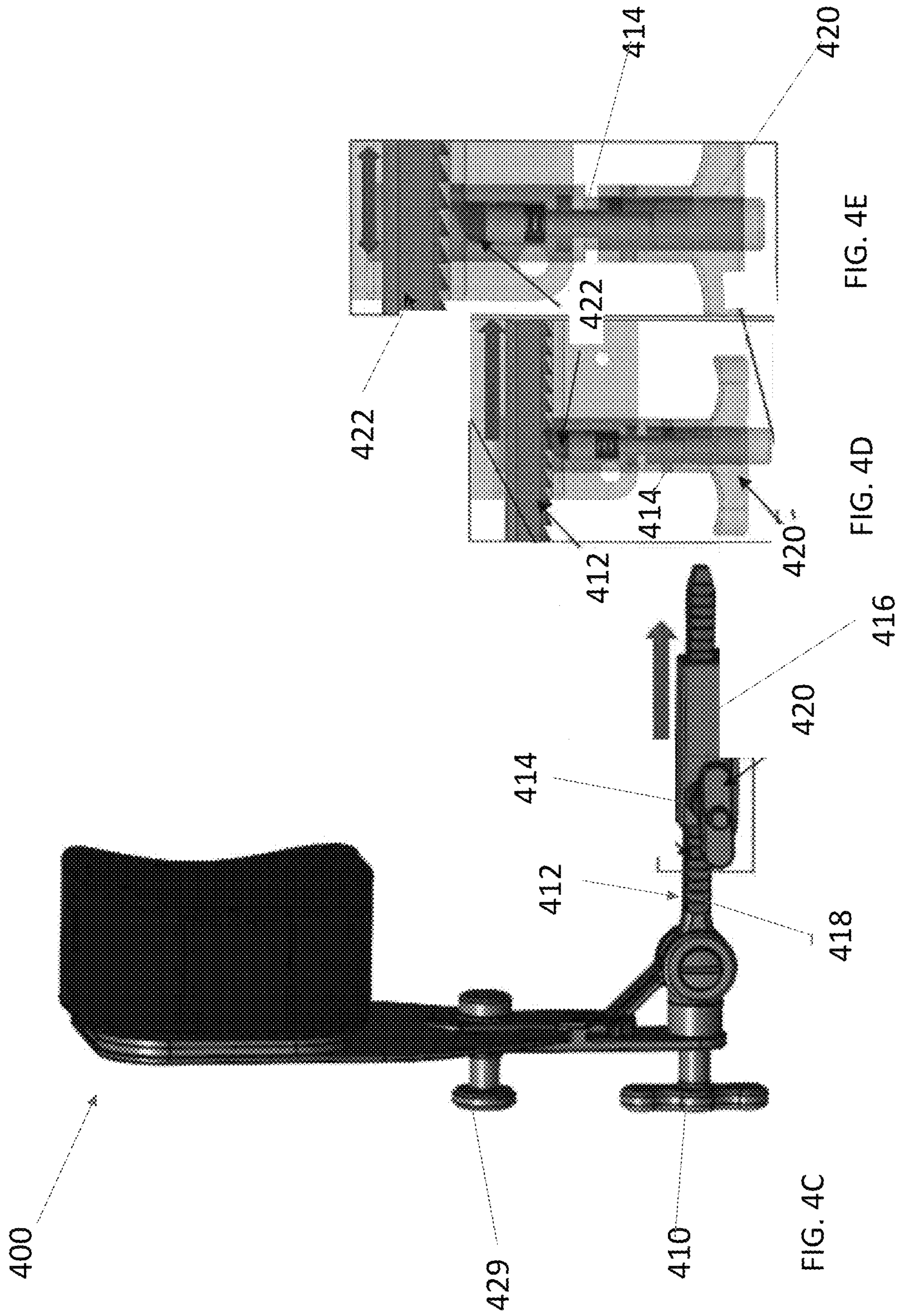
FIGS. 4C, 4D, and 4E illustrate an upper support attachment to a lower support in accordance with examples of the present disclosure.

FIGS. 4C-4E illustrates linear translational motion for the upper support 400. Ability to move the pads medially and laterally to compress on the patient's side. The translation feature always allows motion in the medial direction while providing self-locking in the lateral direction via a linear ratcheting system.

FIG. 4C illustrates a close-up view of the upper support 400. This allows the user to compress the upper support 400 without having to engage extra features. To release the ratcheting function and freely translate the moveable member 412 (e.g., an arm), a pin 414 is pulled. The pin 414 may extend into a passage 416 to secure the moveable member 412 within the passage 416 (e.g., housing coupled to the lower support 402) at a desired position. The moveable member 412 (e.g., a linear ratchet) may include ridges/teeth 417. The moveable member 412 and the pin 414 may form a ratchet mechanism for linear movement/adjustment of the upper support 400.

The ratchet mechanism allows the upper support to move linearly inward or outward as desired. The linear ratchet (the moveable member 412) slides in and out of the passage 416 to facilitate removal of the upper support 400 from the lower support 402 during shipping and modularity options. A release handle 420 may be pulled to adjust the moveable member 412. This translation function can utilize any form of locking including peg-in-hole or crank.

FIG. 4D illustrates a locked configuration where a pawl 412 contacts the moveable member 412. The pawl 422 may be disposed on a distal end of the pin 414. When engaged, the pawl 422 contacts the ridges/teeth 418 to secure the moveable member 412 in place. FIG. 4E illustrates an unlocked configuration where the pawl 422 does not contact the moveable member 412. As the handle 420 is pulled, the pawl 422 moves away (no contact) from the moveable member 412 to allow linear movement of the moveable member 412 through the passage 416.

Linear movement of the moveable member 412 is shown by the directional arrows. In some examples, the ridges 418 may be angled and the pawl 422 may include a corresponding angle to allow only one way movement of the moveable member 412. As shown, the angles/profiles prevent backward movement unless the pin 414 is pulled to release/disengage the pawl 422 from the ridges/teeth 418.

Figures 4F, 4G, 4H:
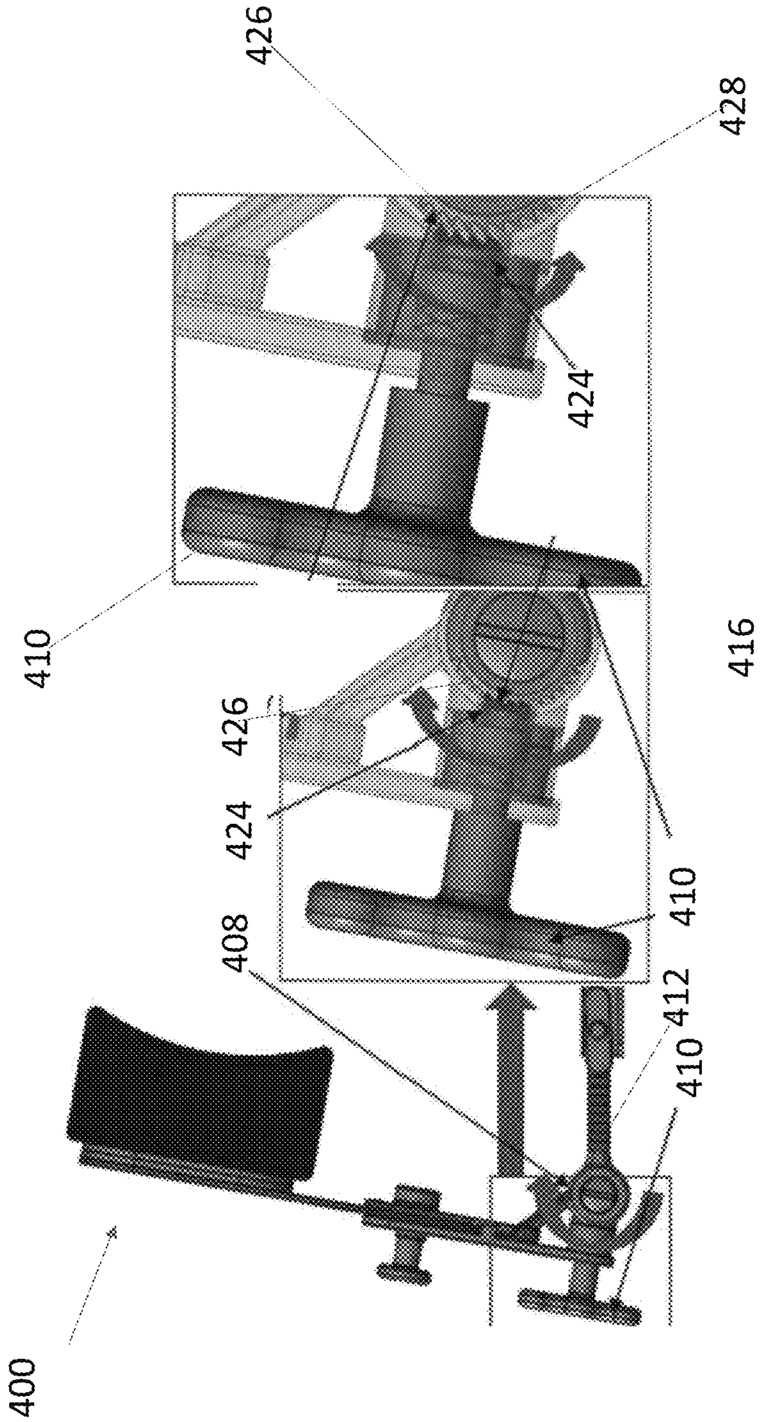
FIGS. 4F, 4G, and 4H illustrate an axial rotation mechanism in accordance with examples of the present disclosure.

FIGS. 4F-4H illustrates axial pad rotation. This allows an ability to "squeeze" in for additional security to the patient. Rather than being locked at a single angle (i.e., 90°), the pads can rotate in toward the patient to apply additional pressure down toward the patient. FIG. 4F illustrates the rotating feature (e.g., curved ratchet/hinge 408) that always allows motion in the direction toward the patient while providing self-locking when rotating away from the patient via a curved ratcheting system. Like the linear ratchet, this allows the user to compress the upper support 400 further without having to engage extra features. The handle 410 may be pulled to allow rotation of the hinge 408 and the upper support 400. The moveable member 412 may extend from the hinge 408.

FIG. 4G illustrates a close-up view of the hinge 408 (e.g., curved ratchet) in a locked configuration. To release the ratcheting function, the handle 410 is pulled which disengages a pawl 424 from teeth 426 of the hinge 408. The hinge 408 may include a curved portion with the teeth 426 extending at least partially along its circumference such as a curved ratchet. The pawl 424 may include angled teeth 428 to correspond with the teeth 426 of the hinge 408 to provide one way rotation. The angles prevent opposite rotation until the pawl 424 is pulled away via the handle 410.

FIG. 4H illustrates an unlocked configuration where the pawl 424 does not contact the ratchet/moveable member 412. The pawl 424 may include an angled contact surfaces (teeth 428) that corresponds with the angled contact surfaces of the teeth 426 to provide one way rotation. The handle 410 may be pulled to rotate the hinge 408 in the opposite direction. Unless the pawl 424 is disengaged, the position of the hinge 408 is secure. Alternatively, this feature could utilize a keyed shaft that provides free rotation until engaged.

Figures 5A, 5B, 5C:
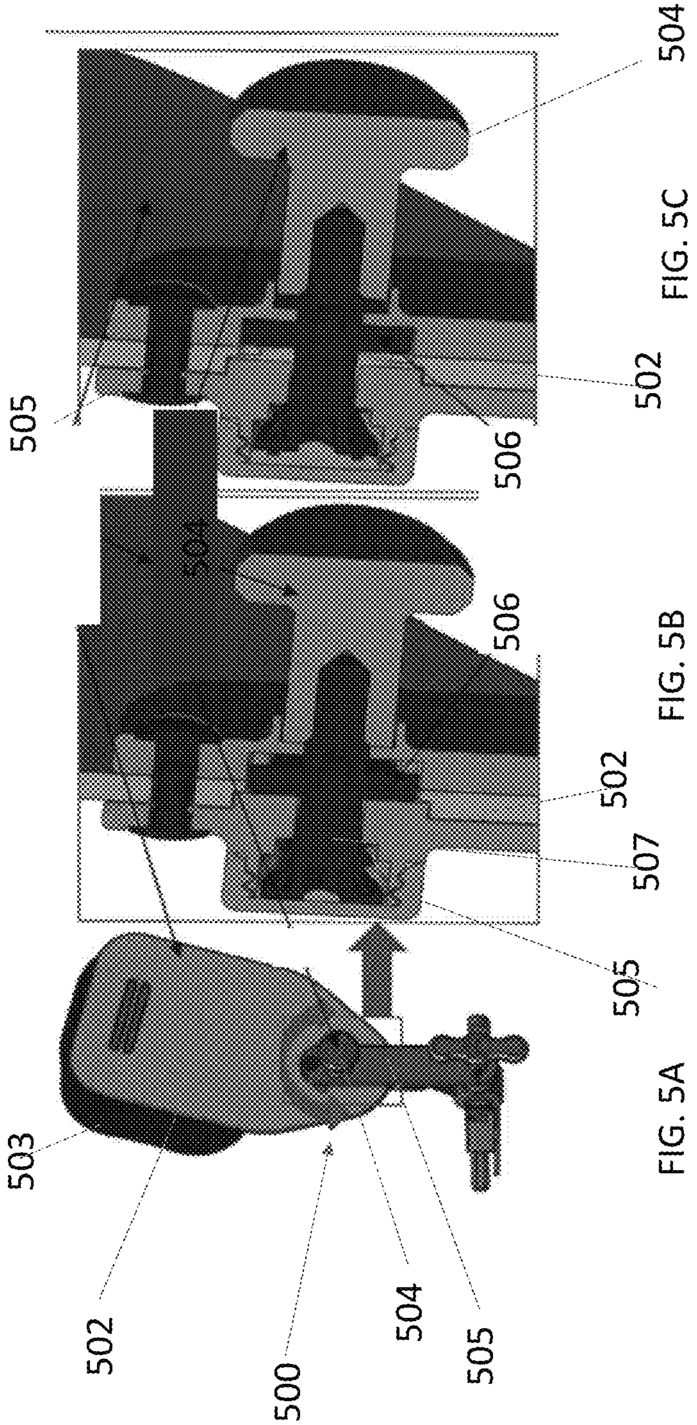
FIGS. 5A-5C illustrate a cephalad/caudal hinge, in accordance with examples of the present disclosure.

FIGS. 5A-5C illustrate a cephalad/caudal hinge 500. As shown on FIG. 5A, the hinge 500 may be pulled to unlock a pad mount 502. This allows an ability to rotate a pad 503 toward or away from the head to move the pad mount 502 out of the way of anatomy (i.e., arms) or surgeon working space. The pad mount 502 is held rigidly until a handle 504 is pulled, which allows rotation. The pad mount 502 may be of any suitable shape and in some examples, the shape may narrow toward the bottom of the pad mount 502. The hinge 500 may also include a housing 505 for internal components.

With additional reference to FIG. 5B, when the handle 504 is released, a hinge lock 506 engages the pad mount 502 back in place. The hinge lock 506 may have a star shape so that the pad mount 502 can lock in many positions. FIG. 5B shows a locked configuration where the handle 504 has not been pulled and the hinge lock 506 is locked. That is, a member 506 coupled to the handle 504 blocks the pad mount 502 from rotating. The member 507 is disposed within the housing 505. FIG. 5C illustrates an unlocked configuration where the handle 504 is pulled and the hinge lock 506 is unlocked. That is, the member 507 that is coupled to the handle 504 is moved within the housing 505 such that the pad mount 502 is able to rotate.

Figures 6A, 6B, 6C:
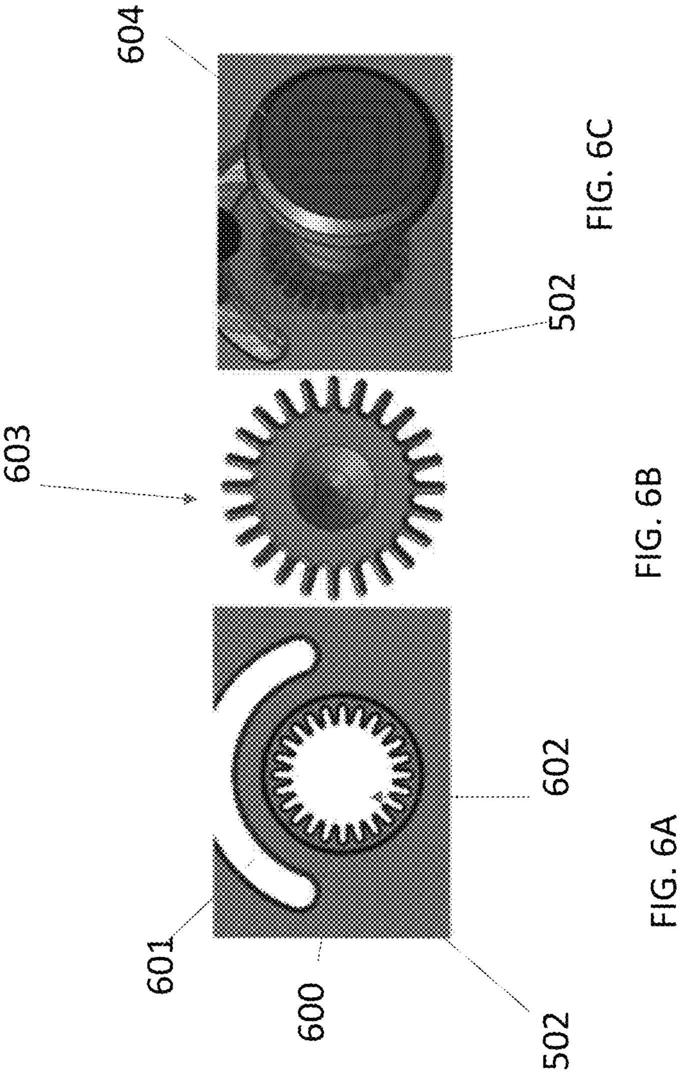
FIGS. 6A-6C illustrate a cephalad/caudal hinge in accordance with examples of the present disclosure.

FIGS. 6A-6C illustrate a locking feature 600 for the a cephalad/caudal hinge (see FIGS. 5A-5C). The pad mount 502 may include a curved slot 601 to facilitate/guide movement of the pad mount 502. The locking feature 600 may include a keyhole 602 of any suitable shape (e.g., star-like).

With additional reference to FIG. 6B, another component of the locking feature 600 includes a key 603 that is placed into the keyhole 602 to secure a position of the cephalad/caudal hinge. FIG. 6C illustrates when a button 604 is depressed, the keyed feature moves out of the way to allow rotation of the pad mount 502. When the button 604 is released, the keyed featured snaps back to the pad mount 502 to lock it in place.

Figure 7:
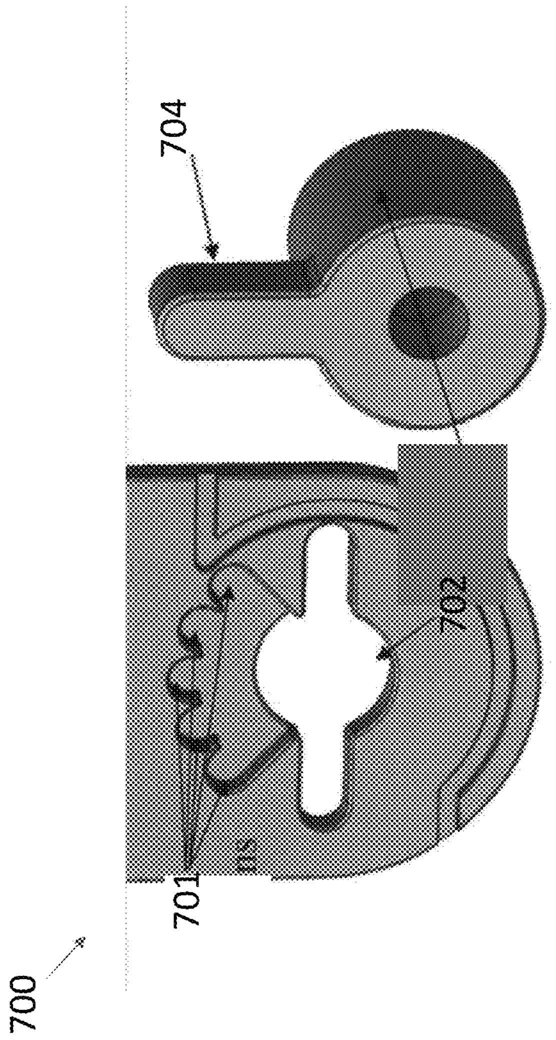
FIG. 7 illustrates keyed locations and a hinging feature for receiving a locking feature, in accordance with examples of the present disclosure.
Figure 8C:
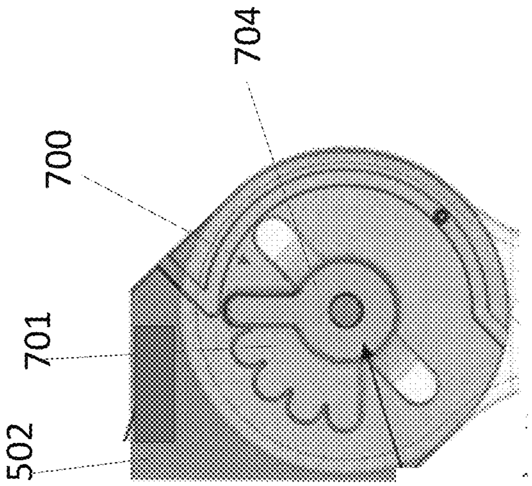
FIGS. 8A-8C illustrate different locking positions with a pad mount and a pad mount lock, in accordance with examples of the present disclosure.
Figure 8B:
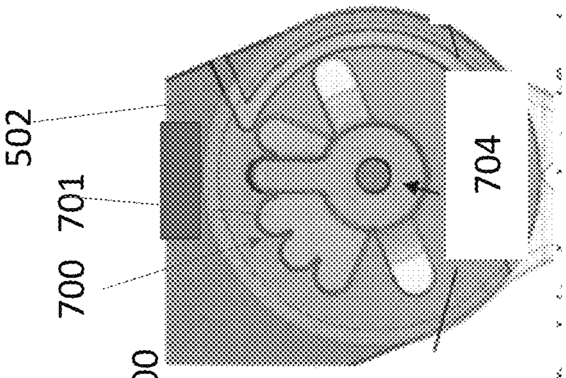
Figure 8A:
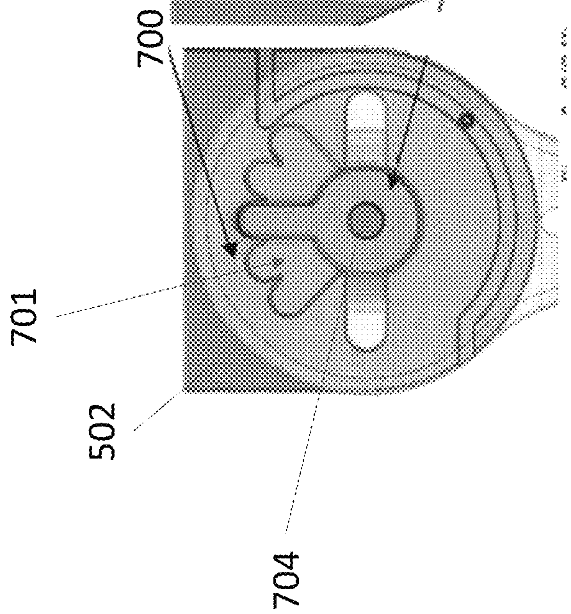

FIG. 7 illustrates a lock 700 including keyed locations 701 and a keyhole 702 for receiving a key 704. The key 704 may be rotated for placement into the locations 701. Each location 701 includes recesses that are oriented at a different angle. The depth of each recess corresponds with the thickness of the key 704 to ensure a secure fit. FIGS. 8A-8C illustrate different locking positions with the pad mount 502 and the lock 700. The lock 700 may be rotated to fit into different positions. Variously shaped orifices may be employed to receive the locking features to allow desired angles for adjustment. The key 704 is positioned differently within the locations 701 in each of FIGS. 8A-8C. That is the pad mount 502 has been rotated and locked into place.

Figures 9A, 9B, 9C, 9D, 9E, 9F:
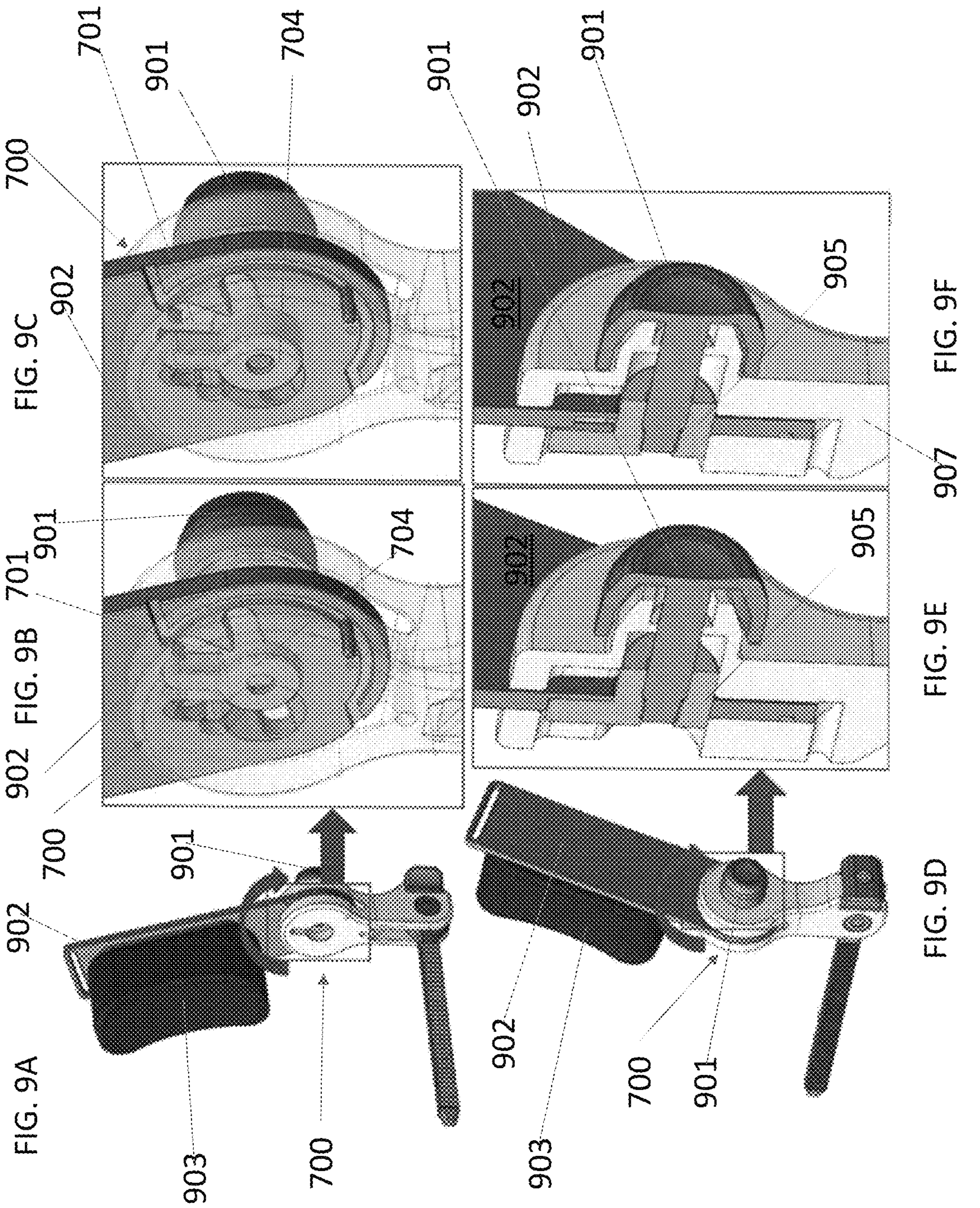
FIGS. 9A-9F illustrate a front side of a hinge locking feature, in accordance with examples of the present disclosure.

FIGS. 9A-9C illustrate a front side of a hinge lock 700. FIG. 9A illustrates a pad mount disposed in the lock 700. The pad 903 may be rotated as desired then locked in place. FIG. 9B shows a locked configuration. The key 704 is placed within the location 701 to secure position of the pad mount 902. FIG. 9C illustrates an unlocked configuration. The key 704 is pulled from the location 701 to allow rotation of the pad mount 902. Components of the lock may be disposed in a housing 907.

FIGS. 9D-9F illustrate a back side of a hinge locking feature 700. A button 901 may be depressed for adjustment/rotation of the mount 902 holding the pad 903. FIG. 9E shows a locked configuration. The button 901 has not been depressed to block travel of the mount 902. A member 905 may be coupled to the button 901. The member 905 may extend into the button 901. FIG. 9F illustrates an unlocked configuration. The button 901 has been depressed to allow rotation. The button 901 has not been depressed to block travel of the mount 902. Upon depression of the button 901, rotation of the mount 902 may occur.

Figures 10A, 10B, 10C:
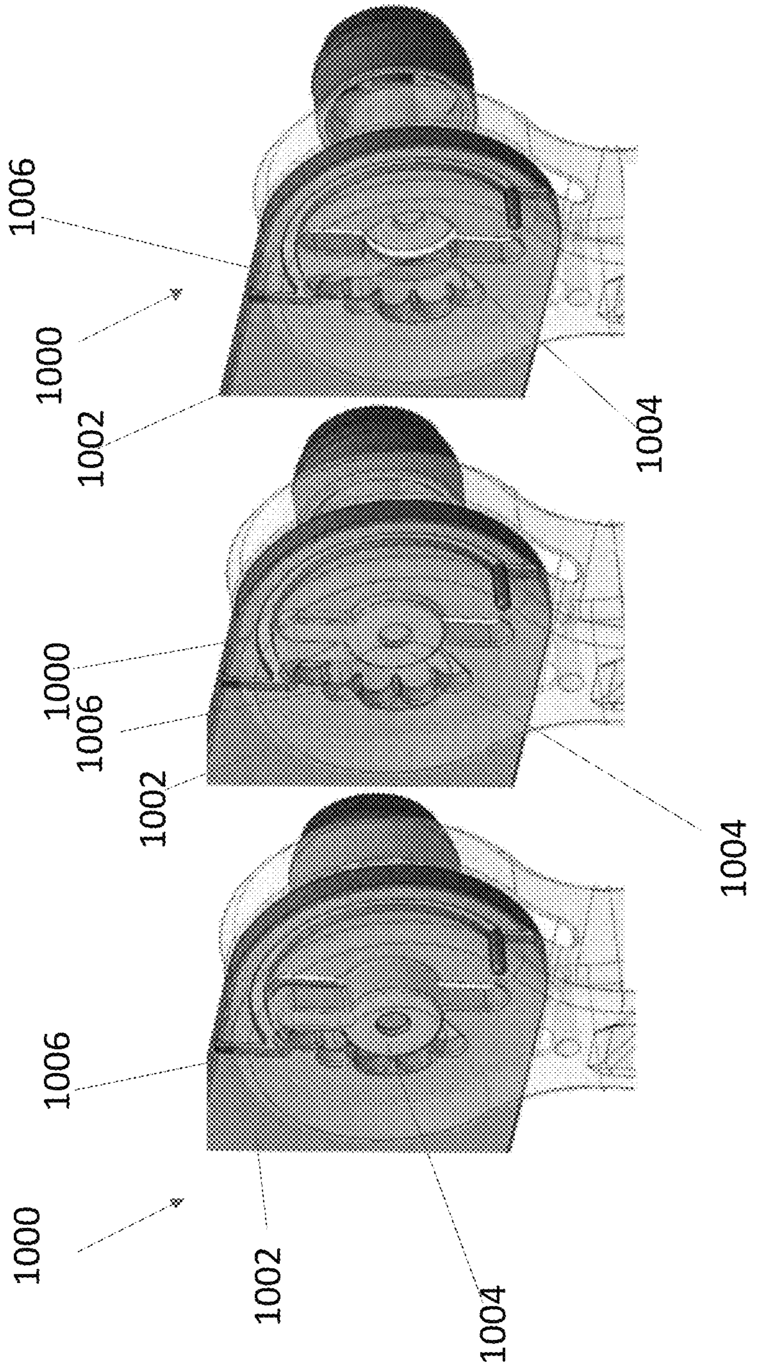
FIGS. 10A-10C illustrate different locking positions with a hinge locking feature including a pad mount for modularity in accordance with examples of the present disclosure.

FIGS. 10A-10C illustrate different locking positions with a hinge locking feature 1000 including a pad mount 1002 for modularity. The mount 1002 and the feature 1000 may be removed and assembled modularly. The feature 1004 may be rotated for placement into the mount 1002. Each of the components are separable to allow disassembly and assembly as a modular procedure. The mount 1002 may be rotated to fit into different positions. Variously shaped orifices may be employed to receive the locking features to allow desired angles for adjustment. The feature 1000 is positioned differently within the keyed locations 1006 in each of FIGS. 10A-10C. That is, the pad mount 1002 has been rotated and locked into place.

Figures 11A, 11B:
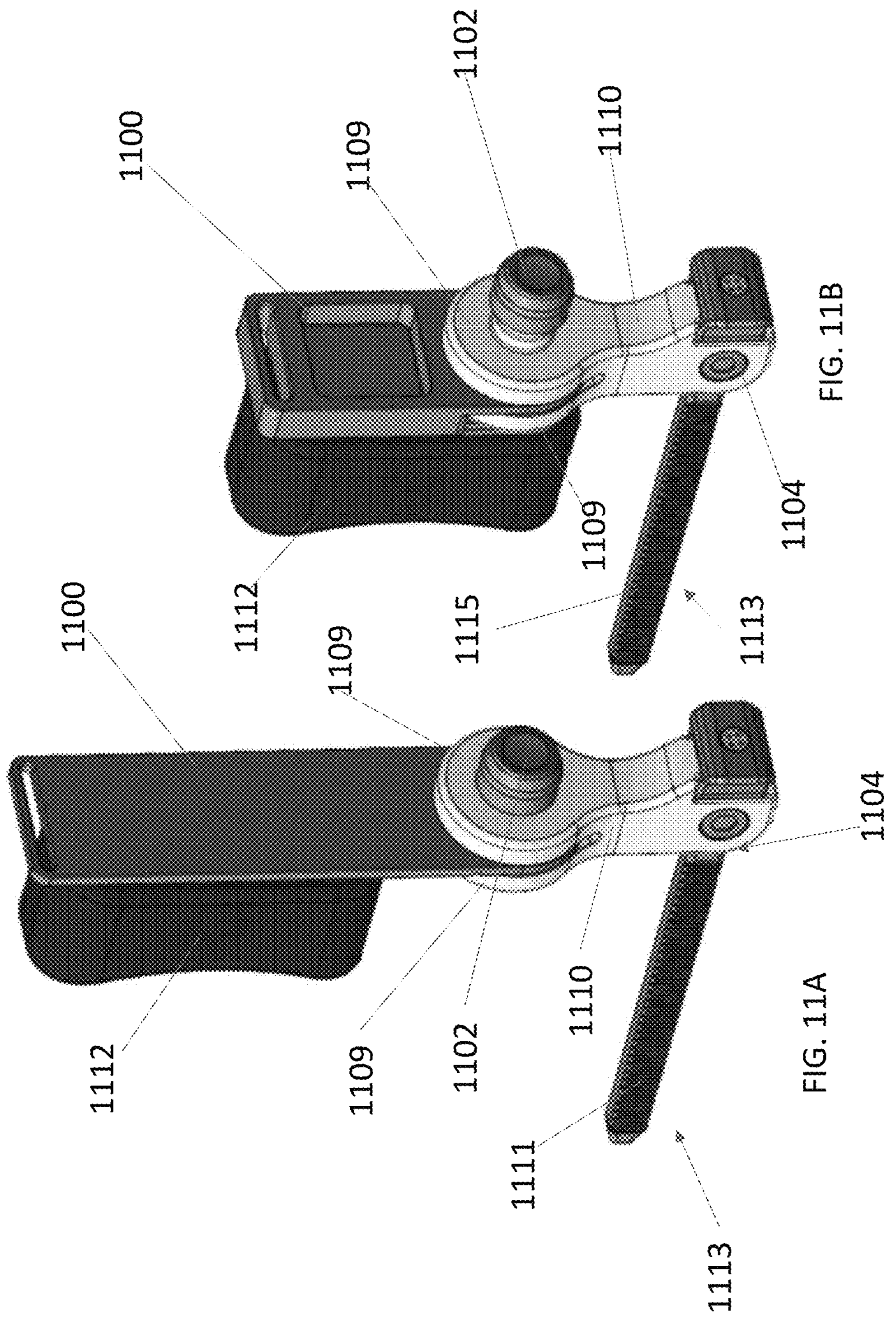
FIGS. 11A and 11B show modular plates in accordance with examples of the present disclosure.

FIGS. 11A and 11B show modular mounting plates 1100. Depressing the button 1102 allows adjustment of the plate 1100. That is, the plate 1100 may be rotated. As shown on FIG. 11A, the plate 1100 is disposed between outer portions 1109 of a housing 1110. FIG. 11B illustrates the plate 1100 disposed on a single outer portion 1109 of the housing 1110 (e.g., right or left portion 1109). A ratcheting mechanism 1111 is disposed at the bottom of the housing 1110. For example, an arm 1113 with teeth 1115 may extend through a housing 1110 that secures the components. Pads 1112 may be coupled to the plates 1100.

Figures 12A, 12B, 12C, 12D:
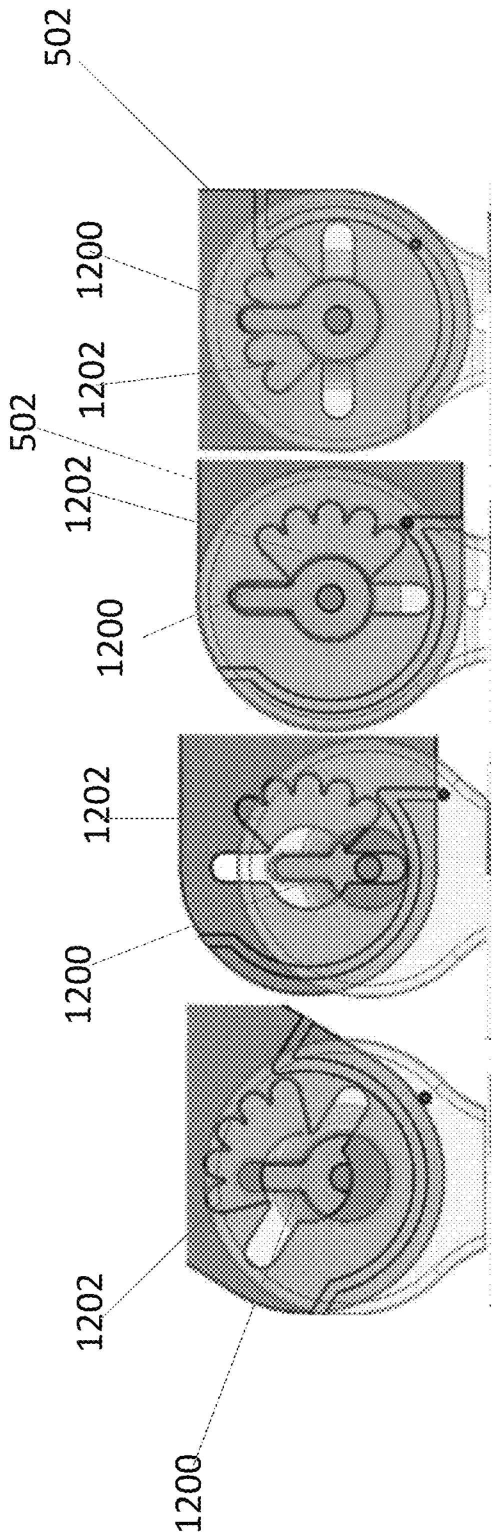
FIGS. 12A-12D illustrate a pad mount alignment feature in accordance with examples of the present disclosure.

FIGS. 12A-12D illustrate an alignment feature for a pad mount, for example, pad mount 502. FIG. 12A shows malalignment of the key 1200 with the keyhole 1202. FIGS. 12B-12D show aligning of the key 1200 with the keyhole 1202. Key 1200 may be a set screw having threads. Each of the components may be rigid structures that allow for rotation of the keyhole 1202. Keyhole 1202 includes keyed locations for receiving key 1200. The key 1200 may be rotated for placement into the locations. Each location includes recesses that are oriented at a different angle. The depth of each recess corresponds with the thickness of the key to ensure a secure fit. FIGS. 12C and 12D illustrate different locking positions with the pad mount 502. The mount 502 may be rotated to fit into different positions. Variously shaped orifices may be employed to receive the locking features to allow desired angles for adjustment. The key 1200 is positioned differently within keyhole 1202 each of FIGS. 12C and 12D. That is, the pad mount 502 has been rotated and locked into place.

Figures 13A, 13B, 13C, 13D:
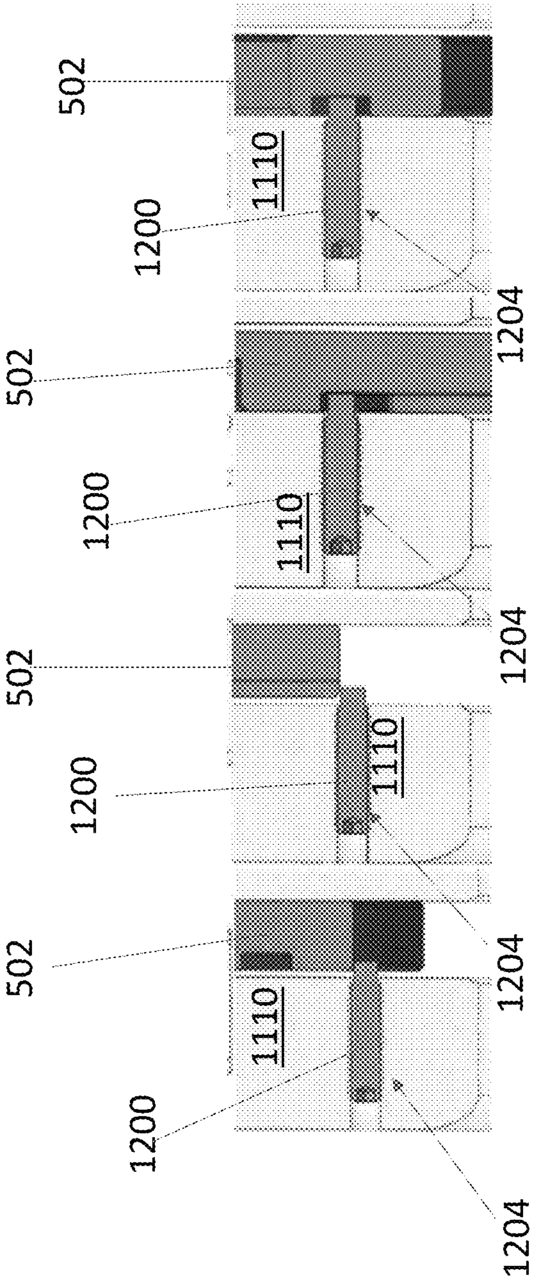
FIGS. 13A-13D illustrate cross-sectional views of FIGS. 12A-12D in accordance with examples of the present disclosure.

FIGS. 13A-13D illustrate cross-sectional views of FIGS. 12A-12D. Threads 1204 may extend along the key 1200. The key 1200 may extend through the housing 1110. Threads 1204 may extend along the locking key 1200. FIG. 13A shows malalignment of the key 1200 with the plate 502. FIGS. 13B-13D show progressive aligning of the key 1200 with the plate 502 to secure placement thereof. The threads may be angled to facilitate travel. The threads may also provide grip. The threads may allow one-way movement and may prevent backward movement in some examples.

Figures 14A, 14B:
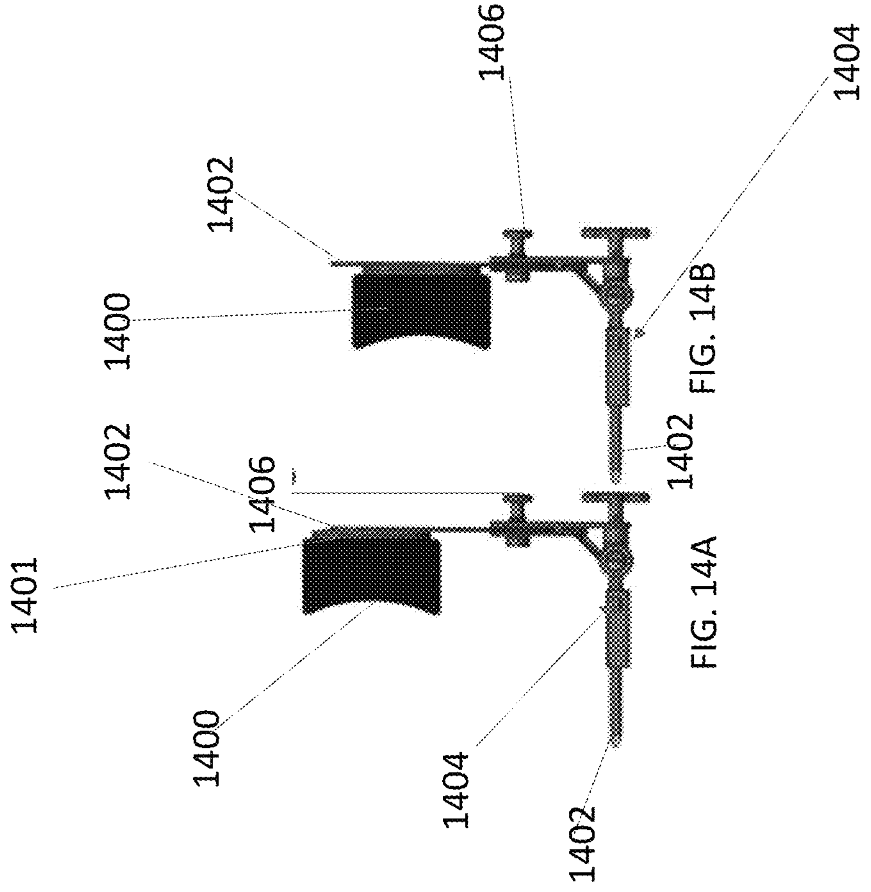
FIGS. 14A and 14B show an adjustable upper pad in accordance with examples of the present disclosure.

FIG. 14A shows an adjustable upper pad 1400. The pad 1400 may be adjustable with Velcro 1401. The pad 1400 may attach to the mount 1402. As shown on FIG. 14B. An arm 1402 may include a ratchet 1404 for adjustment laterally. Vertical adjustment uses a handle 1406. The height and length may be adjusted as shown to allow desired positioning.

Figure 15:
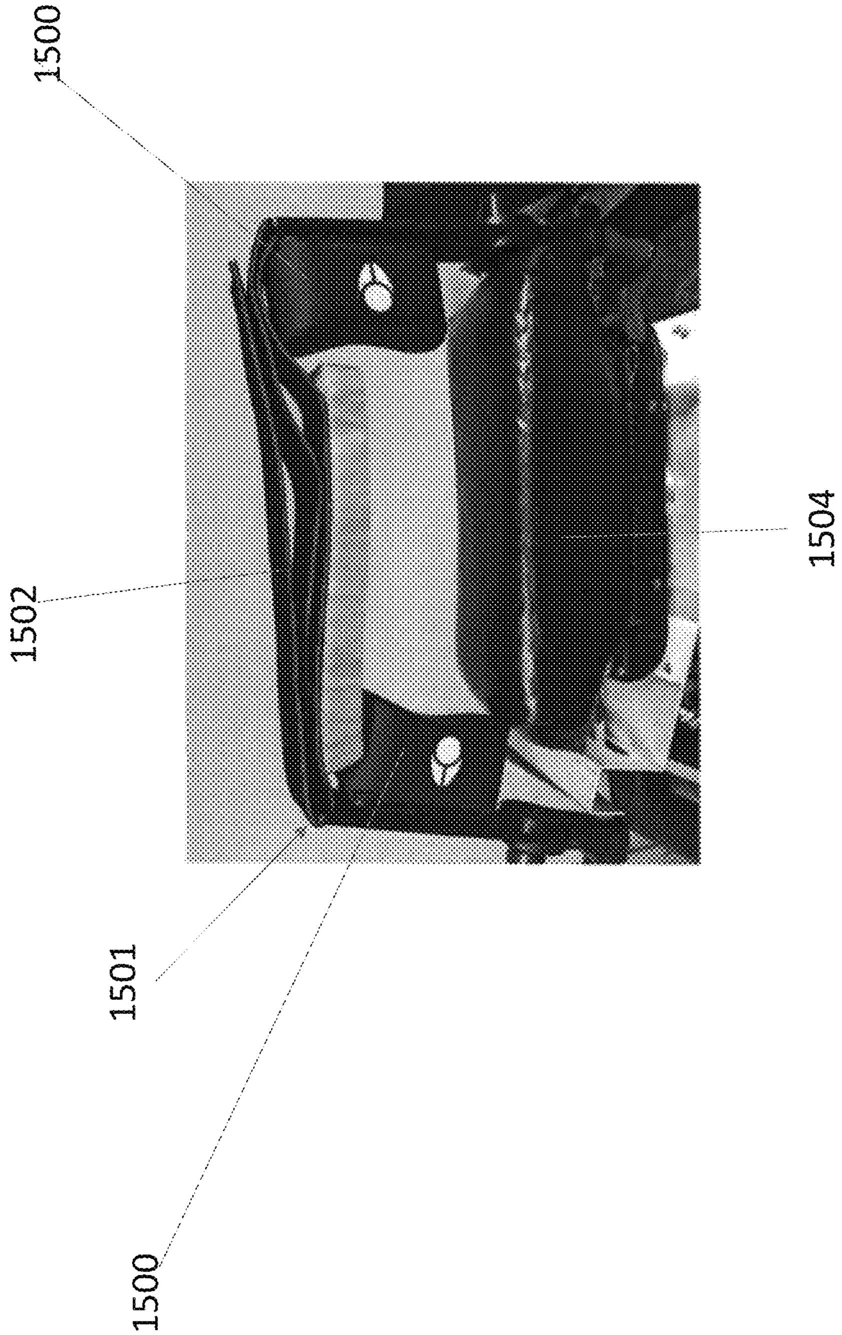
FIG. 15 shows upper supports and a strap coupling them together in accordance with examples of the present disclosure.

FIG. 15 shows upper supports 1500 and a strap 1502 coupling them together. The supports 1500 include slits 1501 to accept the strap 1502 that connects it to the opposing side for cinching on the patient. A pad 1504 may be disposed between the supports 1500. This allows for securing the patient. The straps may be tightened or loosened as desired.

Figure 16A:
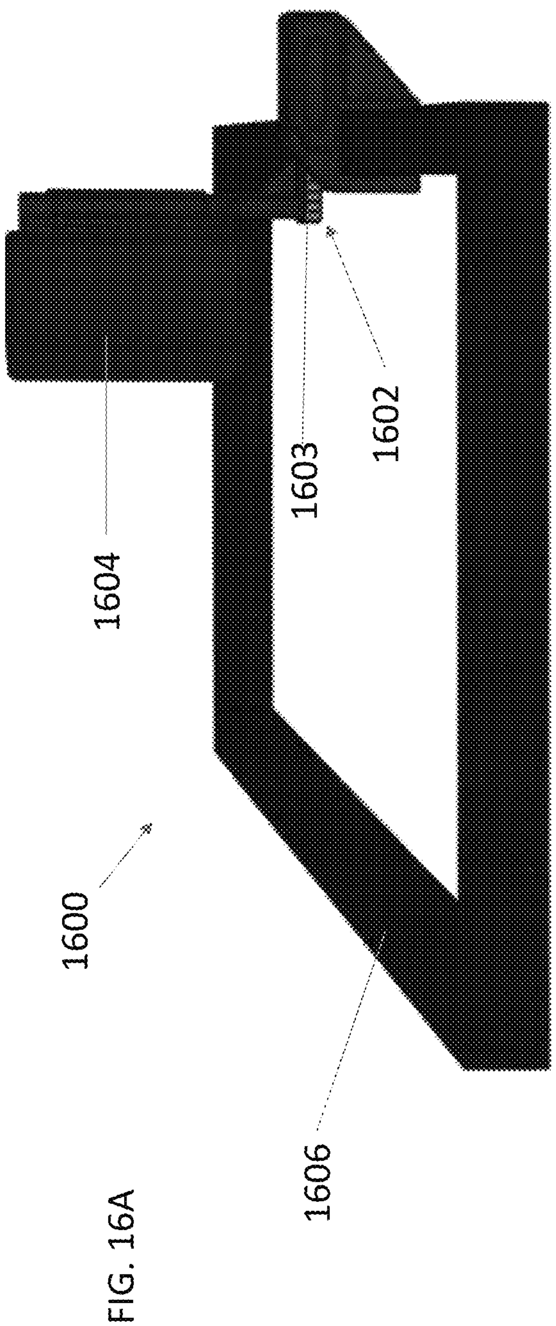
FIGS. 16A and 16B illustrate a bolster that has translational movement so that it can accommodate varying patient anatomy in accordance with examples of the present disclosure.
Figure 16B:
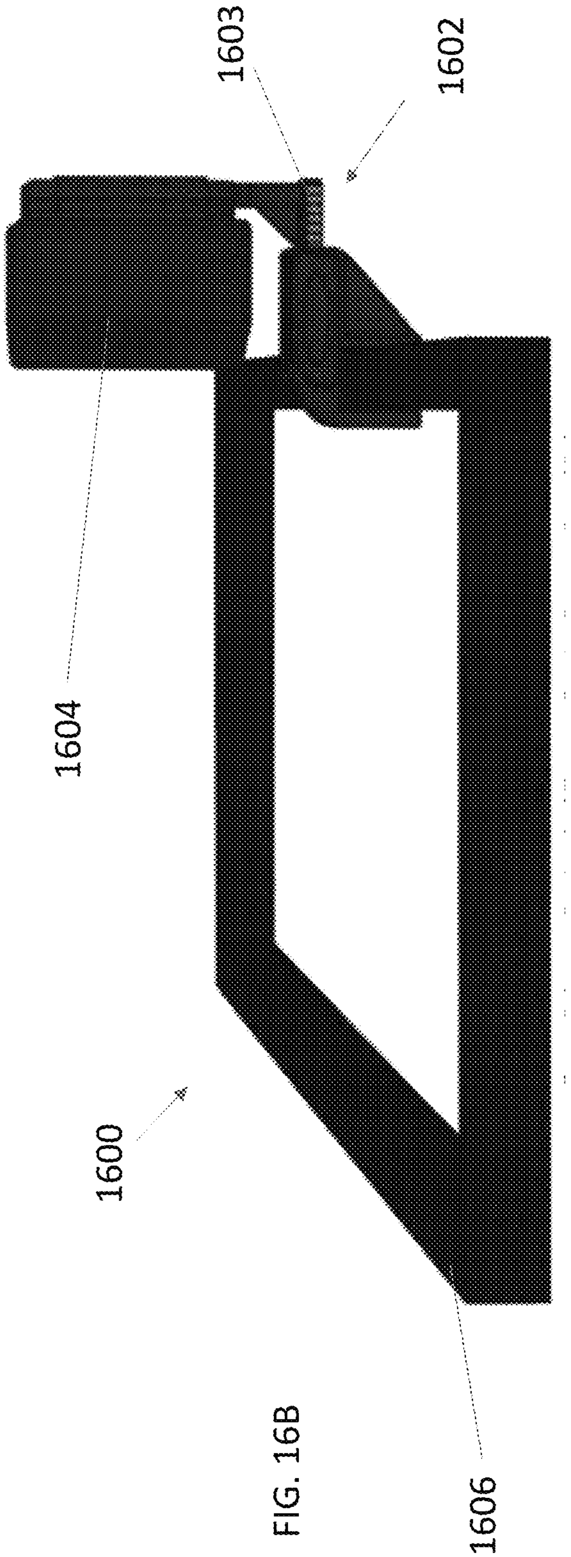

FIGS. 16A and 16B illustrate a bolster 1600 that has translational movement so that it can accommodate varying patient anatomy and allow the user to push the bolster 1600 into the patient's side after they've been positioned on the bed to create (or enhance) the coronal bend. FIG. 16A illustrates an initial position of the bolster 1600. The translational movement will have a locking feature 1602 so that once it is placed in the desired position it will stay rigidly in place. The locking feature 1602 may utilize ratcheting components or may use a "key" feature like a peg in hole, for example as described with regard to FIG. 19. The locking feature 1602 may include an arm 1603.

FIG. 16B illustrates translation of the bolster 1600. The translation feature may utilize a "crank" or "screw" where it moves forward as a handle is turned. The bolster 1600 could be on a table arm mount where it can be moved on joints and locked into place. The bolster 1600 is made out of primarily radiolucent materials so as not to disrupt x-ray imaging. The slider 1604 portion may be contained within the track or be a separate removeable component. The slider 1604 is reversible such that it can be introduced into the track 1606 in either orientation. The reversible slider may have an offset pad support plate such that when introduced to the track 1606 in different orientations, the reach of the pad is larger or smaller, accommodating patients of varying size.

Figure 17:
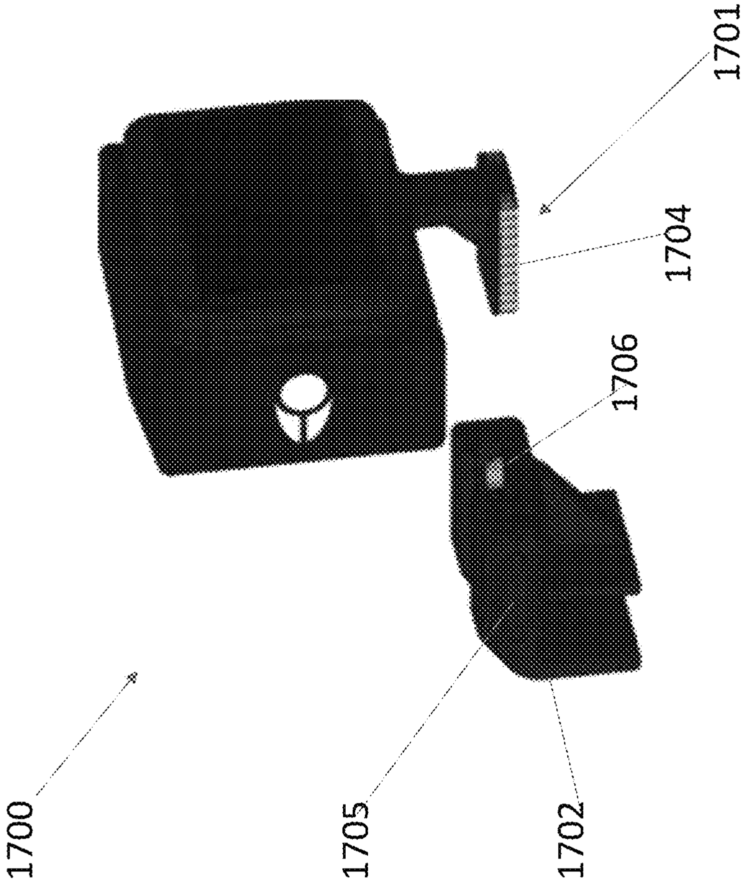
FIG. 17 illustrates a contralateral bolster that may have a multi-tooth lock to allow the slider portion to lock into position at any location within the slider track in accordance with examples of the present disclosure.

FIG. 17 illustrates a contralateral bolster 1700 that may have a multi-tooth lock 1701 to allow the slider portion 1702 to lock into position at any location within the slider track. The bolster 1700 may be used to secure positioning of the patient. The multiple teeth 1704 may be controlled by one unlocking button 1705 such that the user can depress one button 1705 to unlock either (or both) locking pawl teeth 1706. The bolster 1700 may travel linearly.

Figures 18A, 18B:
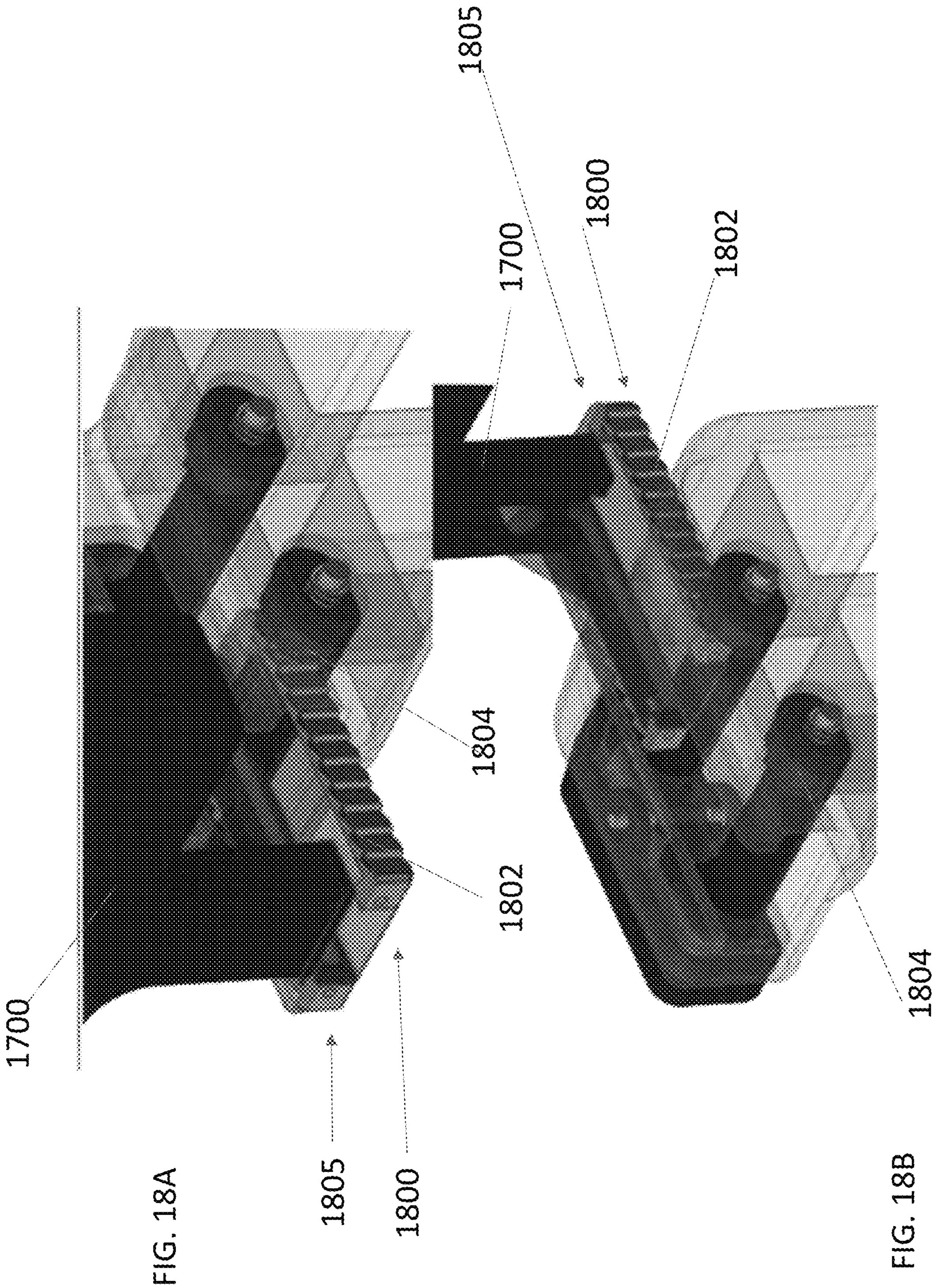
FIGS. 18A and 18B illustrate a ratcheting mechanism for adjustment of the bolster in accordance with examples of the present disclosure.

FIGS. 18A and 18B illustrate a ratcheting mechanism 1800 for adjustment of the bolster 1700. The mechanism 1800 may include teeth 1802 and teeth 1804 which are metal. The teeth 1804 may extend along a moveable member 1805. The member 1805 allows linear movement of the bolster 1700. The different rows of teeth may contact each other for adjustment. Other components may be plastic.

Figure 19:
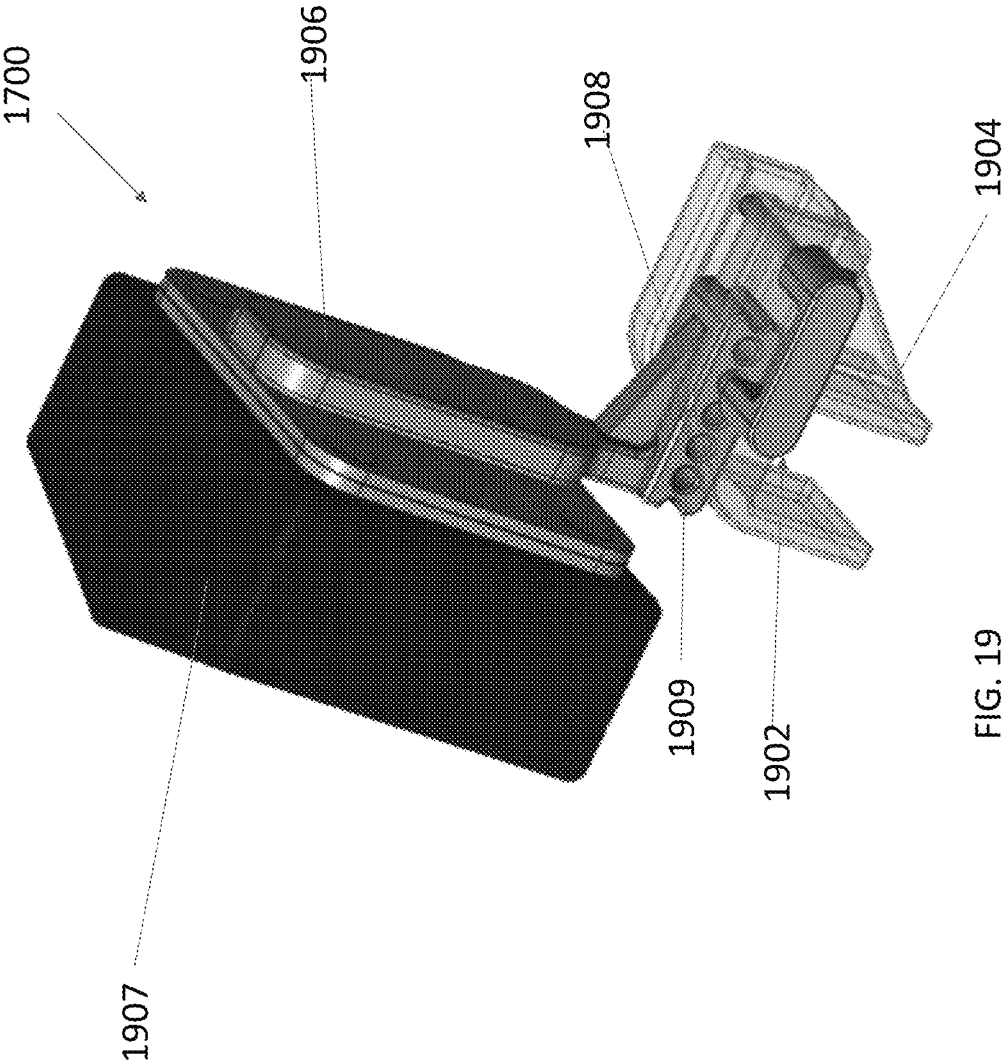
FIG. 19 shows an alternative peg-in-slot locking mechanism to lock translation of the bolster.

FIG. 19 shows a contralateral bolster 1900 may also have a peg 1902 to prevent the slider 1904 from extending too far along the track, to a position in which no locking teeth are engaged with the ratcheting component of the slider 1904. The location of the peg 1902 may also be indicated with an etched or otherwise marked line in the track to give the user visualization when the slider 1904 is approaching or at particular location. Peg 1902 may be used to lock the bolster 1700 in place. The bolster 1700 may include a frame 1906 for attachment of a pad 1907. The frame 1906 includes a lateral extension 1908 with holes 1909 for adjustment.

Figure 20:
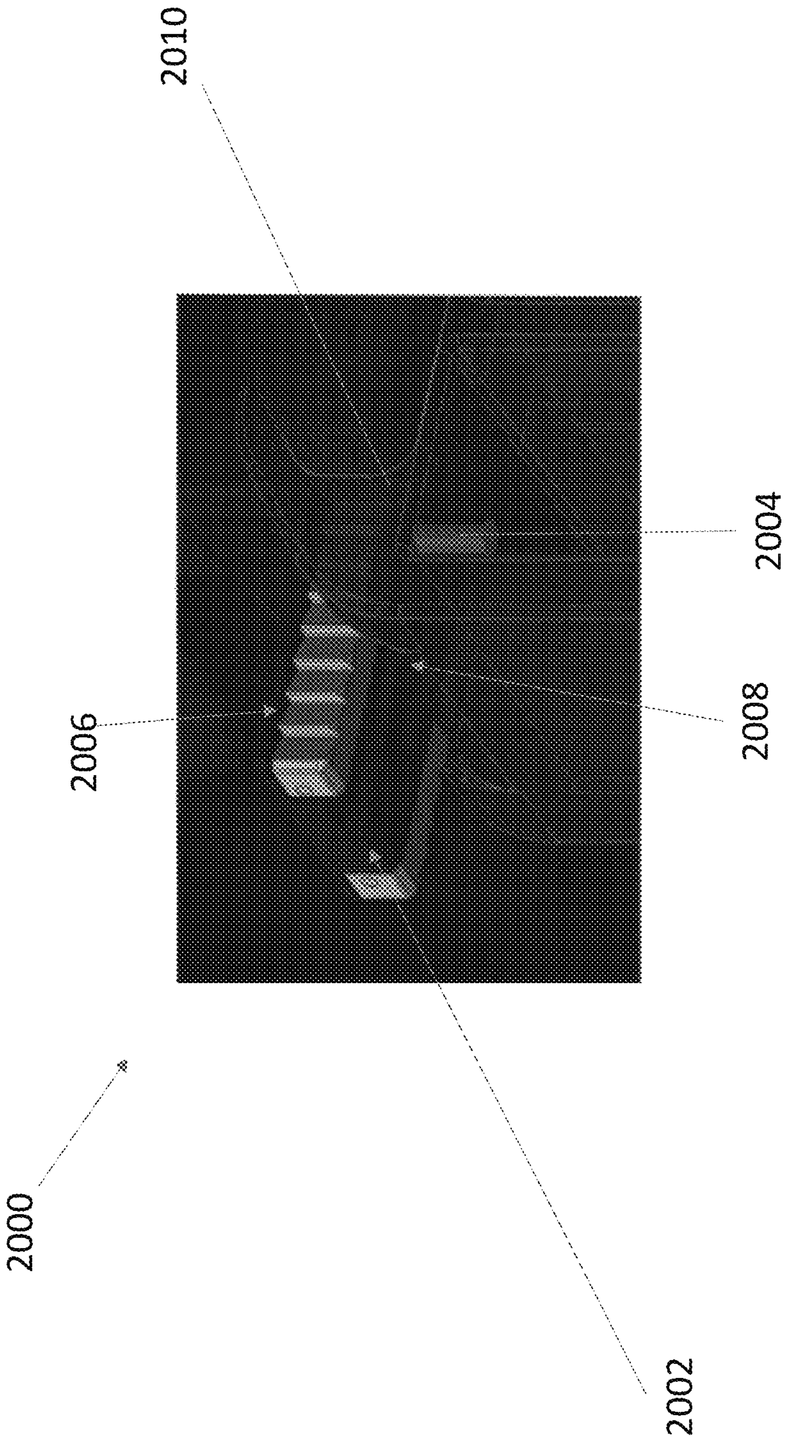
FIG. 20 shows a contralateral bolster that may also have a depth stop in accordance with examples of the present disclosure.

FIG. 20 illustrates the contralateral bolster 2000. The contralateral bolster 2000 may include a removable depth adapter 2004 that can be attached between the pad and pad plate in the event that the user needs additional throw. The adapter 2004 may be a radiolucent material to reduce interference with x-ray imaging. Teeth 2006 may extend along a moveable member 2006 to allow linear movement. The member 2006 may be movable disposed within a track 2008. The track 2008 may be integrated into a frame 2010.

The described embodiments allow for control of tilt and padding break of a patient during surgery with a frame such as a Jackson frame.

Advantages may include padding break to improve lateral access in the prone position. Also, axial tilt is improved for lateral access when the patient is in the prone position. The axial tilt allows ATP access in the prone position. The padding break reduces scoliosis deformity from positioning. The asymmetric axial tilt reduces axial rotation deformity from positioning.

It is believed that the operation and construction of the present disclosure will be apparent from the foregoing description. While the apparatus and methods shown or described above have been characterized as being preferred, various changes and modifications may be made therein without departing from the spirit and scope of the disclosure as defined in the following claims.

What is claimed is:

1. A patient positioning system comprising:
an upper support comprising:
a mounting plate for a pad;
a hinge comprising a curved surface including teeth, the curved surface operable to rotate;
a pawl that is in contact with the teeth of the hinge, wherein the pawl is operable to allow rotation of the pad in a first direction due to angles of the teeth;
a moveable member extending from the hinge, the moveable member including teeth; and
a second pawl that is in contact with the teeth of the moveable member, the second pawl operable to allow movement of the moveable member due to angles of the teeth of the moveable member; and
a lower support connected to the upper support via the moveable member.

2. The system of claim 1, wherein the pawl includes an angled surface that corresponds with the angles of the teeth, the pawl operable to disengage from the hinge to allow rotation in a second direction.

3. The system of claim 1, wherein the pawl is disposed on a distal end of a pin.

4. The system of claim 3, wherein the pin includes a handle or a button.

5. The system of claim 1, wherein the second pawl is disposed on a distal end of a second pin, the second pawl operable to disengage from the moveable member to allow retraction of the moveable member.

6. The system of claim 1, wherein the upper support further comprises a passage operable to receive the moveable member in lateral directions.

7. The system of claim 1, further comprising the pad attached to the mounting plate.

8. The system of claim 1, wherein the upper support further comprises a passage, wherein the second pawl is disposed in the passage.

9. The system of claim 1, wherein the teeth extend along a circumference of the hinge.

10. The system of claim 1, wherein the upper support is removable from the lower support.

11. The system of claim 1, further comprising a frame, wherein the lower support is mounted to the frame.

12. A patient positioning system comprising:
an upper support comprising:
a pad attached to a mounting plate;
a hinge comprising a curved ratchet, the curved ratchet operable to rotate the mounting plate;
a pawl that is in contact with the curved ratchet, wherein the pawl is operable to allow rotation in a first direction due to a surface of the curved ratchet;
a moveable member extending from the hinge, the moveable member including a linear ratchet; and
a second pawl that is in contact with the linear ratchet, the second pawl operable to allow movement of the linear ratchet in a first direction;
a lower support connected to the upper support via the moveable member; and
a frame, wherein the lower support is mounted to the frame.

13. The system of claim 12, wherein the pawl includes an angled surface, the pawl operable to disengage from the curved ratchet to allow rotation in a second direction.

14. The system of claim 13, wherein the pawl is disposed on a distal end of a pin.

15. The system of claim 12, wherein the second pawl is disposed on a distal end of a second pin, the second pawl operable to disengage from the linear ratchet to allow movement in a second direction.

16. The system of claim 12, wherein the upper support is removable from the lower support.

17. A patient positioning system comprising:
an upper support comprising:
a pad for receiving a patient;
a curved ratchet, the curved ratchet comprising teeth, the curved ratchet operable to rotate the pad;
a pawl that is in contact with the teeth of the curved ratchet, wherein the pawl is operable to allow rotation of the pad in a first direction due to a surface of the curved ratchet;
a moveable member extending from a hinge, the moveable member including a linear ratchet; and
a second pawl that is in contact with the linear ratchet, the second pawl operable to allow movement of the linear ratchet in a first direction;
a lower support connected to the upper support via the moveable member, the upper support comprising a second pad; and
a frame, wherein the lower support is mounted to the frame.

18. The system of claim 17, wherein the pawl is operable to disengage from the curved ratchet to allow rotation in a second direction.

19. The system of claim 17, wherein the second pawl is coupled to a handle.

20. The system of claim 17, wherein the pawl includes an angled surface.

* * * * *